(12) United States Patent
Yoshihara et al.

(10) Patent No.: US 9,234,095 B2
(45) Date of Patent: Jan. 12, 2016

(54) THERMALLY-CONDUCTIVE ORGANIC ADDITIVE, RESIN COMPOSITION, AND CURED PRODUCT

(71) Applicant: KANEKA CORPORATION, Osaka-shi, Osaka (JP)

(72) Inventors: Shusuke Yoshihara, Osaka (JP); Kazuaki Matsumoto, Osaka (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/507,156

(22) Filed: Oct. 6, 2014

(65) Prior Publication Data

US 2015/0025188 A1    Jan. 22, 2015

Related U.S. Application Data

(62) Division of application No. 13/395,914, filed as application No. PCT/JP2010/057390 on Apr. 26, 2010, now abandoned.

(30) Foreign Application Priority Data

Sep. 16, 2009    (JP) ................. 2009-213907

(51) Int. Cl.
    C08L 63/00    (2006.01)
    C08L 67/02    (2006.01)
    C08K 3/00    (2006.01)
    C09K 5/14    (2006.01)
    C09K 19/38    (2006.01)
    F28F 21/06    (2006.01)

(52) U.S. Cl.
    CPC . C08L 67/02 (2013.01); C09K 5/14 (2013.01); C09K 19/3804 (2013.01); F28F 21/06 (2013.01)

(58) Field of Classification Search
    CPC .................. C08L 63/00; C09L 67/02
    See application file for complete search history.

(56) References Cited

U.S. PATENT DOCUMENTS

| | | | |
|---|---|---|---|
| 4,539,386 A | 9/1985 | Yoon | |
| 4,617,371 A * | 10/1986 | Blumstein et al. | C09K 19/3809 252/299.01 |
| 4,837,407 A | 6/1989 | Nezu | |
| 4,904,752 A | 2/1990 | Kanoe et al. | |
| 4,904,757 A | 2/1990 | Coassolo et al. | |
| 5,068,052 A | 11/1991 | Watanabe et al. | |
| 5,138,022 A | 8/1992 | Mang et al. | |
| 5,216,073 A * | 6/1993 | Haider et al. | C08L 23/0884 525/132 |
| 5,218,045 A * | 6/1993 | Jones et al. | C08G 81/00 525/118 |
| 5,258,134 A | 11/1993 | Yoshinaga et al. | |
| 5,306,806 A | 4/1994 | Tanabe et al. | |
| 6,261,481 B1 | 7/2001 | Akatsuka et al. | |
| 6,369,157 B1 | 4/2002 | Winckler et al. | |
| 6,680,002 B2 | 1/2004 | Yamauchi et al. | |
| 6,784,260 B2 | 8/2004 | Yeager et al. | |
| 7,056,988 B2 | 6/2006 | Yao | |
| 7,109,288 B2 | 9/2006 | Akatsuka et al. | |
| 2001/0049430 A1 | 12/2001 | Winckler et al. | |
| 2003/0094725 A1 | 5/2003 | Yao | |
| 2003/0168634 A1 | 9/2003 | Yamauchi et al. | |
| 2004/0147709 A1 | 7/2004 | Akatsuka et al. | |
| 2004/0224163 A1 | 11/2004 | Tobita et al. | |
| 2006/0276568 A1 | 12/2006 | Akatsuka et al. | |
| 2008/0021146 A1 * | 1/2008 | Komatsu et al. | C08K 524/437 524/437 |
| 2008/0242772 A1 | 10/2008 | Nakamura et al. | |
| 2009/0091045 A1 | 4/2009 | Tanikawa et al. | |
| 2010/0016498 A1 | 1/2010 | Kaji et al. | |
| 2010/0080997 A1 | 4/2010 | Seki et al. | |
| 2010/0104870 A1 | 4/2010 | Funatsu et al. | |
| 2011/0204282 A1 | 8/2011 | Yoshihara et al. | |
| 2012/0175549 A1 | 7/2012 | Yoshihara et al. | |
| 2014/0106169 A1 | 4/2014 | Funatsu et al. | |

FOREIGN PATENT DOCUMENTS

| | | | |
|---|---|---|---|
| DE | 4226994 A1 | 2/1994 | |
| EP | 0612802 A1 | 8/1994 | |
| EP | 2348071 A1 | 7/2011 | |
| JP | 60-40127 A | 3/1985 | |
| JP | 61-296068 A | 12/1986 | |
| JP | 63-125521 A | 5/1988 | |
| JP | 63-264828 A | 11/1988 | |
| JP | 63-295620 * | 12/1988 | .............. C08L 63/00 |
| JP | 1-149303 A | 6/1989 | |
| JP | 02-005307 A | 1/1990 | |
| JP | 02-028352 A | 1/1990 | |

(Continued)

OTHER PUBLICATIONS

Derwent ABstract for JP 63-295620 (Acc. No. 1989-019700, Dec. 1988).*

(Continued)

*Primary Examiner* — Brieann R Fink
(74) *Attorney, Agent, or Firm* — Westerman, Hattori, Daniels & Adrian, LLP

(57) ABSTRACT

A resin composition includes
(A) a thermally-conductive organic additive including a liquid crystalline thermoplastic resin which has a mainly-chain structure, wherein a main chain of the liquid crystalline thermoplastic resin contains mainly a repeating unit represented by the general formula (1):

-M-Sp-    (1)

where M represents a mesogenic group and Sp represents a spacer,
(B) a thermosetting resin; and
(C) an inorganic filler.

18 Claims, No Drawings

(56) References Cited

FOREIGN PATENT DOCUMENTS

| | | | |
|---|---|---|---|
| JP | 02-127438 A | 5/1990 | |
| JP | 6-298928 A | 10/1994 | |
| JP | 8-143653 A | 6/1996 | |
| JP | 2000-80257 A | 3/2000 | |
| JP | 2002-284864 A | 10/2002 | |
| JP | 2002-371129 A | 12/2002 | |
| JP | 2003-246923 A | 9/2003 | |
| JP | 2003-268070 A | 9/2003 | |
| JP | 2007-224060 A | 9/2007 | |
| JP | 2008-150525 A | 7/2008 | |
| JP | 2008-169265 A | 7/2008 | |
| JP | 4-249528 A | 4/2009 | |
| JP | 2009-91440 A | 4/2009 | |
| JP | 2010-037474 A | 2/2010 | |
| JP | 2010-150377 A | 7/2010 | |
| JP | 2011-52204 A | 3/2011 | |
| JP | 2011-063790 A | 3/2011 | |
| JP | 2011-084714 A | 4/2011 | |
| JP | 2011-084715 A | 4/2011 | |
| JP | 2011-084716 A | 4/2011 | |
| TW | 200845331 A | 11/2008 | |
| TW | 200902782 A | 1/2009 | |
| WO | WO 99/96286 * | 5/1999 | ............ H01L 23/373 |
| WO | 02/094905 A1 | 11/2002 | |
| WO | 2006/120993 A1 | 11/2006 | |
| WO | WO 2008/068068 * | 6/2008 | ........... C09D 167/00 |
| WO | 2008/130958 A1 | 10/2008 | |
| WO | 2010/050202 A1 | 5/2010 | |
| WO | 2011/033815 A1 | 3/2011 | |

OTHER PUBLICATIONS

Derwent ABstract for WO 2008/068068 (Acc. No. 2008-J18053, Jun. 2008).*
Extended European Search Report dated Feb. 5, 2015, issued in corresponding Application No. 11771732.2. (5 pages).
Antipov, Evgueni, M. et al., "First observation of a columnar mesophase in a carborane-containing main-chain semiflexible copolymer". Macromol, Rapid Common. Jan. 20, 1999, vol. 20, pp. 185-189.
Office Action dated Dec. 23, 2014, issued in Taiwanese Patent Application No. 100113591 (6 pages).
Office Action dated Dec. 23, 2014, issued in Taiwanese Patent Application No. 100113593 (4 pages).
International Search Report of PCT/JP2010/057390, mailing date Jul. 13, 2010.
Notification of Transmittal of Translation of the International Preliminary Report on Patentability (Form PCT/IB/338) of International Application No. PCT/JP2010/057390 mailed Apr. 19, 2012 with Forms PCT/IB/373 and PCT/ISA/237.
C. L. Choy, et al, "Thermal conductivity of highly oriented polyethylene", Polymer, Feb. 1978, pp. 155-162, vol. 19.
Kurt Geibel, et al., "In Situ Photopolymerized, Oriented Liquid-Crystalline Diacrylates with High Thermal Conductivities", Advanced Materials, 1993, pp. 107-109, vol. 5, No. 2.
International Search Report of PCT/JP2009/005700, mailing date of Jan. 19, 2010.
Masatoshi Tokita, et al., "Chain-Folded Lamellar Structure in the Smectic H Phase of a Main-Chain Polyester", Macromolecules, 1998, pp. 8590-8594, vol. 31.
Watanabe, et al., "Crystalline and Liquid Crystal Transitions of Mesogenic Polymer Mixtures and Random Copolymers", Macromolecules, 1984, pp. 2288-2295, vol. 17, (pp. 2288-2295).
Notification of Transmittal of Translation of the International Preliminary Report on Patentability ( Form PCT/IB/338) of International Application No. PCT/JP2009/005700 mailed Jul. 7, 2011 with Form PCT/IPEA/409.
International Search Report of PCT/JP2011/002212, date of mailing Jul. 19, 2011.
Asrar, J et al., "Thermotropic Homopolyesters. I. The Preparation and Properties of Polymers Based on 4, 4'-Dihydroxybiphenyl", Journal of Polymer Science: Polymer Physics Edition, vol. 21, p. 1119-1131 (1983).

Krigbaum, W.R. et al., "Thermotropic homopolyesters: 5. Investigation of the smectic phase of polyesters based on p,p'-bibenzoic acid", Polymer, vol. 24, p. 1299-1307, Oct. 1983.
Van Luyen, D., et al., "Influence De La Structure Sur Les Proprietes Mesomorphes Des Polyesters—II", w/ English abstract, European Polymer Journal, vol. 16, p. 303-306 (1980).
Maret, G. et al., "Orientation of Thermotropic Liquid-Crystalline Polyesters in High Magnetic Fields", Mol. Cryst. Liq. Cryst., vol. 88, pp. 295-309 (1982).
Martinez-Gomez, A. et al., "Effect of the intercalated/exfoliated nanostructure on the phase transformations of smectic polyester/ layered silicate hybrids: Reinforcement of the liquid-crystalline matrix", Polymer, vol. 50, No. 6, p. 1447-1455 (2009).
Yoshihara, S. et al., "Enhanced Thermal Conductivity of Thermoplastics by Lamellar Crystal Alignment of Polymer Matrices", Macromolecular Chemistry and Physics, p. 1-7, Aug. 30, 2012.
Yoshihara, S. et al., "Lamellar Crystal Alignment of Main Chain Liquid Crystal Polyester and Thermal Conductivity", p. 1, May 15, 2012.
Yoshihara, S. et al., "New Thermally Conductive Thermoplastic Liquid Crystal Polyester", p. 1-2, Aug. 29, 2012.
Notification of Transmittal of Translation of the International Preliminary Report on Patentability (Form PCT/IB/338) of International Patent Application No. PCT/JP2011/002212, dated Nov. 15, 2012, with Forms PCT/IB/373 and PCT/ISA/237.
Notification of Transmittal of Translation of the International Preliminary Report on Patentability (Form PCT/IB/338) of International Patent Application No. PCT/JP2011/002208, dated Nov. 15, 2012, with Forms PCT/IB/373 and PCT/ISA/237.
International Search Report of PCT/JP2011/002208, dated Jul. 26, 2011.
Scaffaro, R. et al., "Effects of Filler Type and Mixing Method on the Physical Properties of a Reinforced Semirigid Liquid Crystal Polymer", Eur. Polym. J., vol. 32, No. 7, p. 869-875, 1996; US Office Action dated Jun. 10, 2013.
US Office Action dated Jun. 10, 2013, issued in U.S. Appl. No. 13/126,246.
US Office Action dated Oct. 12, 2012, issued in U.S. Appl. No. 13/126,246.
Chinese Office Action dated Oct. 10, 2013, issued in corresponding Chinese Patent Application No. 201180019698.6 (5 pages).
U.S. Advisory Action dated Nov. 8, 2013, issued in co-pending U.S. Appl. No. 13/126,246 (3 pages).
U.S. Notice of Allowance dated May 13, 2013, issued in U.S. Appl. No. 13/641,939.
Paci et al., "Calorimetric Study of Blends of Poly(Butylene Terephthalate) and a Liquid Crystalline Polyester", Journal of Polymer Science: Part B: Polymer Physics, vol. 25, (1987), pp. 1595-1605.
CAPlus abstract of Paci "Calorimetric Study of Blends of Poly(Butylene Terephthalate) and a Liquid Crystalline Polyester", Journal of Polymer Science: Part B: Polymer Physics, vol. 25, (1987) pp. 1595-1605) and a Registry entry for RN 70800-12-3, (4 pages).
U.S. Office Action dated Jan. 22, 2014, issued in related U.S. Appl. No. 13/126,246, (17 pages).
Maeda Y. et al., "High-pressure DTA study on liquid crystalline polyesters with biphenyl as mesogen", Thermochimica Acta, 266, (1995), pp. 189-202, cited in U.S. Office Action dated Jan. 22, 2014, issued in corresponding U.S. Appl. No. 13/126,246.
W-F. A. Su, "Thermoplastic and Thermoset Main Chain Liquid Crystal Polymers Prepared from Biphenyl Mesogen", Journal of Polymer Science: Part A: Polymer Chemistry, vol. 31, (1993), pp. 3251-3256, U.S. Office Action dated Jan. 22, 2014, issued in corresponding U.S. Appl. No. 13/126,246.
U.S. Office Action dated Jun. 19, 2014, issued in related U.S. Appl. No. 13/126,246, (18 pages).
U.S. Office Action dated Apr. 11, 2014, issued in related U.S. Appl. No. 13/641,964, (42 pages).
Japanese Office Action dated Jun. 3, 2014, issued in corresponding Japanese Patent Application No. 2011-531816, w/English translation (10 pages).

* cited by examiner ic and has thermoplasticity. Further, since the liquid

THERMALLY-CONDUCTIVE ORGANIC ADDITIVE, RESIN COMPOSITION, AND CURED PRODUCT

CROSS-REFERENCE TO RELATED APPLICATIONS

This application is a Divisional application of U.S. application Ser. No. 13/395,914 filed Mar. 14, 2012, which is a national stage application filed under 35 USC §371 of International Application No. PCT/JP2010/057390 filed Apr. 26, 2010, which is based on and claims the benefit of priority from Japanese Patent Application No. 2009-213907 filed on Sep. 16, 2009, the entire contents of which being incorporated herein by reference.

TECHNICAL FIELD

The present invention relates to a novel thermally-conductive organic additive which is highly thermally conductive and capable of imparting thermal conductivity to plastic. In particular, the present invention relates to a thermally-conductive organic additive which (i) is an organic polymer, unlike a thermally conductive inorganic filler such as ceramic, metal and a carbon material, (ii) is capable of imparting thermal conductivity to plastic by being added to the plastic, (iii) can reduce the weight of a composition even when added to a resin in a large amount, without causing abrasion on molds and deteriorating an electrical insulation property of the composition, and (iv) provides the composition with excellent molding processability.

BACKGROUND ART

In a case where a thermoplastic resin composition is used for various applications such as housings of a personal computer and a display device, an electronic device material, automotive exterior and interior parts, and the like, there sometimes occurs a problem that it is difficult to release generated heat because plastic is less thermally conductive than an inorganic substance such as a metal material. In order to solve such a problem, an attempt has been extensively made to obtain a highly thermally conductive resin composition by blending, with a thermoplastic resin, a highly thermally conductive inorganic compound in a large amount. In order to obtain a highly thermally conductive resin composition, it is necessary to blend, with a resin, a highly thermally conductive inorganic compound such as graphite, carbon fiber, alumina, or boron nitride generally in an amount of not less than 30 vol % and further in an amount of as many as not less than 50 vol %. However, when an inorganic compound such as graphite or carbon fiber is blended in a resin in a large amount, the resin will have a reduced electrical insulation property and thereby become electrically conductive. This causes a problem that only a limited portion of the resin can be used in an electronic device application. Further, when a ceramic filler such as alumina is blended in a resin in a large amount, the resin will cause abrasion on a mold due to a high hardness of the filler, in a case where the resin is used as a molding material. Further, since a high density of the filler will increase the density of an obtained composition, the resin makes it difficult to reduce the weight of an electronic device or the like. Another approach to use a filler which has a relatively low density and hardness, such as a boron nitride filler, has also been reported. However, even if such filler is used, it is inevitable that blending an inorganic compound with a thermoplastic resin significantly lowers molding processability of a resin composition, as long as the inorganic compound is added to the resin in a large amount. This is because an inorganic compound cannot be dissolved at a molding temperature of a resin.

From such a viewpoint, it has been strongly desired to develop a thermally-conductive organic additive which (i) has properties such as a low density, a low hardness, and an electrical insulation, and (ii) can be dissolved at a molding temperature of a resin.

Epoxy resins described in Patent Literatures 1 and 2, or bismaleimide resins described in Patent Literature 3, for example, have been reported as a thermosetting resin in which a resin per se has an excellent thermal conductivity. Unfortunately, these resins cannot improve molding processability of a resin composition since the resins have a thermosetting property and are not dissolved at the molding temperatures of the resins.

In contrast, there have been some examples of researches on a thermoplastic resin as to a special molding process such as extension or magnetic field orientation during an injection molding process so as to give the thermoplastic resin a high thermal conductivity in a specified direction. However, these techniques are not applicable to a thermally-conductive organic additive.

CITATION LIST

Patent Literature 1
International Publication, No. WO 2002/094905
Patent Literature 2
International Publication, No. WO 2006/120993
Patent Literature 3
Japanese Patent Application Publication, Tokukai, No. 2007-224060 A

SUMMARY OF INVENTION

Technical Problem

One object of the present invention is to provide a thermally-conductive organic additive (i) in which a resin per se is highly thermally conductive, and (ii) which can be produced easily and has thermoplasticity.

Solution to Problem

The inventors of the present invention (i) have found that a liquid crystalline thermoplastic resin of a specific structure, in which a resin per se has an excellent thermal conductivity, is well suited to a thermally-conductive organic additive, and (ii) arrived at the present invention.

More specifically, a thermally-conductive organic additive in accordance with the present invention is 1) a thermally-conductive organic additive including a liquid crystalline thermoplastic resin which has a mainly-chain structure, wherein a main chain of the liquid crystalline thermoplastic resin contains mainly a repeating unit represented by the general formula (1):

-M-Sp- (1)

wherein M represents a mesogenic group; and Sp represents a spacer, the liquid crystalline thermoplastic resin per se having a thermal conductivity of not less than 0.45 W/(m·K).

Advantageous Effects of Invention

The liquid crystalline thermoplastic resin per se in accordance with the present invention is highly thermally conductive. Thus, the liquid crystalline thermoplastic resin (i) is an organic polymer, unlike a thermally conductive inorganic filler such as ceramic, metal and a carbon material, (ii) is capable of imparting thermal conductivity to plastic by being added to the plastic, (iii) can reduce the weight of a composition even when added to a resin in a large amount, without causing abrasion on molds and deteriorating an electrical insulation property of the composition, and (iv) provides the composition with excellent molding processability. The liquid crystalline thermoplastic resin in accordance with the present invention is thus useful as a thermally-conductive organic additive.

For a fuller understanding of other objects, features and advantages of the invention, reference should be made to the following description.

DESCRIPTION OF EMBODIMENTS

A liquid crystalline thermoplastic resin contained in a thermally-conductive organic additive in accordance with the present invention is configured to have a mainly-chain structure, wherein a main chain of the liquid crystalline thermoplastic resin contains mainly a repeating unit represented by the general formula (1):

  (1)

wherein M represents a mesogenic group; and Sp represents a spacer.

The term "mainly" in the present invention means, as for an amount of the substances in the formula (1) contained in the main chain of a molecular chain, that the amount is not less than 50 mol %, preferably not less than 70 mol %, more preferably not less than 90 mol %, and most preferably substantially not less than 100 mol %, with respect to total structural units. In a case where the amount is less than 50 mol %, the resin may be less crystalline and thus less thermally conductive.

Since the resin of the present invention is extremely highly symmetrical and has a structure in which rigid chains are bonded by a flexible chain, the resin of the present invention is such that molecules are highly oriented and a high-order structure is densely formed. The resin of the present invention, therefore, has an excellent thermal conductivity.

A thermal conductivity of the liquid crystalline thermoplastic resin in the thermally-conductive organic additive in accordance with the present invention is generally not less than 0.45 W/(m·K), preferably not less than 0.6 W/(m·K), more preferably not less than 0.8 W/(m·K), further preferably not less than 1.0 W/(m·K), still more preferably not less than 1.2 W/(m·K), and particularly preferably not less than 1.3 W/(m·K). An upper limit of the thermal conductivity is not particularly limited. Generally, values of the thermal conductivity can be exemplified by not more than 30 W/(m·K), and further not more than 10 W/(m·K), although higher value is more preferable. A thermoplastic resin, which does not at all contain a repeating unit composed of a mesogenic group and a spacer, has a lower thermal conductivity and is therefore not preferable. The liquid crystalline thermoplastic resin in the thermally-conductive organic additive of the present invention is preferably a liquid crystalline thermoplastic resin which itself has a thermal conductivity of not less than 0.45 W/(m·K). A thermal conductivity of the liquid crystalline thermoplastic resin is measured specifically in such a manner that a thermal conductivity of a disk-shaped sample (6 mm in thickness×Φ20 mm) into which the liquid crystalline thermoplastic resin is molded is measured with the use of a hot disk method.

The mesogenic group contained in the liquid crystalline thermoplastic resin in the thermally-conductive organic additive of the present invention refers to a substituent group which is rigid and highly-oriented. A preferable mesogenic group is exemplified by a group represented by the general formula:

wherein each of $A^1$ and $A^2$ independently represents a substituent group selected from an aromatic group, a condensed aromatic group, an alicyclic group, and an alicyclic heterocyclic group; and x is a connector and represents a direct bond, or a bivalent substituent group selected from the group consisting of —$CH_2$—, —$C(CH_3)_2$—, —O—, —S—, —$CH_2$—$CH_2$—, —C≡C—, —C=C—, —CO—, —CO—O—, —CO—NH—, —CH=N—, —CH=N—N=CH—, —N=N—, and —N(O)=N—. It is preferable that each of $A^1$ and $A^2$ be independently selected from a $C_6$-$C_{12}$ hydrocarbon group having a benzene ring, a $C_{10}$-$C_{20}$ hydrocarbon group having a naphthalene ring, a $C_{12}$-$C_{24}$ hydrocarbon group having a biphenyl structure, a $C_{12}$-$C_{36}$ hydrocarbon group having three or more benzene rings, a $C_{12}$-$C_{36}$ hydrocarbon group containing a condensed aromatic group, and a $C_4$-$C_{36}$ alicyclic heterocyclic group.

It is preferable that each of $A^1$ and $A^2$ is independently selected from a $C_1$-$C_2$ hydrocarbon group containing a benzene ring, a $C_1$-$C_2$ hydrocarbon group containing a naphthalene ring, a $C_1$-$C_2$ hydrocarbon group having a biphenyl structure, a $C_2$-$C_6$ hydrocarbon group having three or more benzene rings, a $C_{12}$-$C_{36}$ hydrocarbon group containing a condensed aromatic group, and a $C_4$-$C_{36}$ alicyclic heterocyclic group.

Specific Examples of $A^1$ and $A^2$ include: phenylene, biphenylene, naphthylene, anthracenylene, cyclohexyl, pyridyl, pyrimidyl, and thiophenylene. $A^1$ and $A^2$ may be unsubstituted or a derivative which contains a substituent group such as an aliphatic hydrocarbon group, a halogen group, a cyano group, and a nitro group.

Of these bivalent substituent groups, a bivalent substituent group is preferable in which x, which corresponds to the connector, has a main chain length of even-numbered atoms. This is because the liquid crystalline thermoplastic resin per se is likely to be highly crystalline and thus has improved thermal conductivity due to an increase in molecular width of the mesogenic group and an increase in degree of freedom of bond rotation. Namely, a direct bond, or a bivalent substituent group which is selected from the group consisting of —$CH_2$—$CH_2$—, —C=C—, —C≡C—, —CO—O—, —CO—NH—, —CH=N—, —CH=N—N=CH—, —N=N—, and —N(O)=N— is preferable.

Specific examples of such a mesogenic group include: biphenyl, terphenyl, quarterphenyl, stilbene, diphenyl ether, 1,2-diphenylethylene, diphenylacetylene, benzophenone, phenyl benzoate, phenylbenzamide, azobenzene, 2-naphtoate, phenyl-2-naphtoate, and bivalent groups which have a structure in which two hydrogens are removed from a derivative or the like of such a mesogenic group as mentioned above. Of these examples of mesogenic groups, a direct bond is particularly preferable. The mesogenic group represented by the general formula (3) is further preferable.

[Chem. 1]

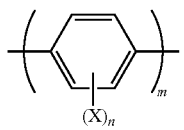

(3)

wherein X independently represents an aliphatic hydrocarbon group, F, Cl, Br, I, CN, or $NO_2$; n is an integer of 0 to 4; and m is an integer of 2 to 4.

This mesogenic group is rigid and highly oriented due to its structure, and can also be easily available or synthesized. Specific examples of the mesogenic group includes: biphenyl, terphenyl, and quarterphenyl.

In order to obtain a thermally-conductive organic additive, a mesogenic group contained in a resin can contain crosslinking substituent group.

The spacer contained in the liquid crystalline thermoplastic resin in the thermally-conductive organic additive refers to a flexible molecular chain. The spacer contained in the liquid crystalline thermoplastic resin preferably has a main chain length of 4 to 28 atoms, more preferably of 6 to 24 atoms, and still more preferably of 8 to 20 atoms. (In this case, a main chain length of 4 atoms refers to, for example, a structure of "—C—C—C—C—"). A liquid crystalline thermoplastic resin containing a spacer whose main chain length is within the above-mentioned range of atoms is preferable, since such a liquid crystalline thermoplastic resin is highly crystalline and thus has a good thermal conductivity, while a molecular structure of the liquid crystalline thermoplastic resin is sufficiently flexible.

A kind of atom constituting the main chain of the spacer is not particularly limited and any atom is applicable. The atom constituting the main chain of the spacer is preferably at least one kind of atom selected from C, H, O, S, and N.

A preferable spacer is exemplified by a group represented by the general formula below:

wherein each of y and z independently represents a direct bond, or a bivalent substituent group selected from the group consisting of —$CH_2$—, —$C(CH_3)_2$—, —O—, —S—, $CH_2$—$CH_2$—, —C=C—, —C≡C—, —CO—, —CO—O—, —CO—NH—, —CH=N—, —CH=N—N=CH—, —N=N—, and —N(O)=N—; and R represents a bivalent substituent group whose main chain length is 2 to 20 atoms and which may be branched. R is generally selected from a $C_2$-$C_{20}$ chain saturated hydrocarbon group, a $C_2$-$C_{20}$ saturated hydrocarbon group containing 1 to 3 ring structure(s), a $C_2$-$C_{20}$ hydrocarbon group containing 1 to 5 unsaturated group(s), a $C_2$-$C_{20}$ hydrocarbon group containing 1 to 3 aromatic ring(s), and a $C_2$-$C_{20}$ polyether group containing 1 to 5 oxygen atom(s).

The spacer is specifically exemplified by an aliphatic hydrocarbon chain, a polyether chain, or the like. R is preferably a linear aliphatic hydrocarbon chain which is not branched. R may be saturated or unsaturated, but is preferably a saturated aliphatic hydrocarbon chain since the liquid crystalline thermoplastic resin containing such a saturated aliphatic hydrocarbon chain is appropriately flexible. Units of more than 50 wt % of total R are preferably a saturated aliphatic hydrocarbon chain, and most preferably R does not contain an unsaturated bond.

R has a main chain length of preferably 2 to 20 carbon atoms, more preferably 4 to 18 carbon atoms, and still more preferably 6 to 16 carbon atoms. R is preferably a linear saturated aliphatic hydrocarbon chain which has a main chain length of within the above-mentioned range of carbon atoms, and more preferably a linear saturated aliphatic hydrocarbon which has a main chain length of even-numbered carbon atoms, since a spacer containing such R bonds mesogenic groups linearly. Due to the fact that mesogenic groups are bonded linearly, crystallinity of the liquid crystalline thermoplastic resin is hardly reduced and thermal conductivity thereof can be ensured. In a case where R is a linear saturated aliphatic hydrocarbon which has a main chain length of even-numbered carbon atoms, mesogenic groups are more regularly oriented, so that the liquid crystalline thermoplastic resin is likely to be more highly thermally conductive.

In particular, for the sake of obtaining a resin with an excellent thermal conductivity, R is preferably one kind selected from —$(CH_2)_8$—, —$(CH_2)_{10}$—, and —$(CH_2)_{12}$—. y and z are groups for bonding the substituent group R with the mesogenic group. Of spacers containing such groups, —CO—O—R—O—CO— and —O—CO—R—CO—O— are preferable, and —O—CO—R—CO—O— is particularly preferable for the sake of obtaining a resin with an excellent thermal conductivity.

Preferably, a liquid crystalline thermoplastic resin used in the thermally-conductive organic additive of the present invention has a main chain which contains a repeating unit represented by:

1. -$A^1$-x-$A^2$-y-R-z-, or
2. a combination of a mesogenic group represented by the above-described general formula (3) and a spacer represented by -y-R-z-.

A number average molecular weight of a liquid crystalline thermoplastic resin contained in the thermally-conductive organic additive of the present invention refers to a value obtained as follows: Assuming that polystyrene is a reference material, the number average molecular weight is measured by GPC (Gel Permeation Chromatography) at 80° C. by use of a 0.25 wt % solution of the liquid crystalline thermoplastic resin used in the present invention in a solvent of p-chlorophenol and o-dichlorobenzene mixed in a ratio of 1:2 (vol %).

The liquid crystalline thermoplastic resin to be used in the present invention has a number average molecular weight preferably of 3000 to 40000, more preferably of 5000 to 30000, and most preferably of 7000 to 20000. The liquid crystalline thermoplastic resin which has a number average molecular weight of within the range mentioned above but has an identical primary structure will have a high thermal conductivity. Accordingly, the liquid crystalline thermoplastic resin which has a preferred number average molecular weight of less than 3000 or more than 40000 but has an identical primary structure may have a thermal conductivity of less than 0.45 W/(m·K).

A liquid crystalline thermoplastic resin used as the thermally-conductive organic additive of the present invention preferably contains lamellar crystals. In the liquid crystalline thermoplastic resin of the present invention, the amount of the lamellar crystals can be used as an indication of crystallinity. The greater the amount of the lamellar crystals is, the higher crystallinity is.

A lamellar crystal referred to in the present invention correspond to a plate crystal in which long chain molecules are folded so as to be juxtaposed to each other. It is easily determined, by transmission electron microscopic (TEM) observation or X-ray diffraction, whether or not such a crystal is contained in a resin.

A ratio of lamellar crystals having such a continuous layer structure to a resin can be found by directly observing, by a transmission electron microscope (TEM), a sample dyed with $RuO_4$. Specifically, the ratio of lamellar crystals can be found by using, as a sample for TEM observation, an ultrathin slice which has a thickness of 0.1 μm and has been prepared by a microtome after cutting out a part of a molded sample (6 mm in thickness×Φ20 mm) and dying the part with $RuO_4$. The ultrathin slice thus prepared is observed by TEM at an acceleration voltage of 100 kV, so as to obtain a photograph with a 40,000×scale (20 cm×25 cm). The photograph allows determination of a lamellar crystal region. A boundary of the lamellar crystal region can be determined assuming that the lamellar crystal region is a region in which a periodic change occurs. Because lamellar crystals are distributed also in a thickness direction, the ratio of lamellar crystals is found as a ratio of the lamellar crystal region to a total area of the photograph. In order to cause a resin itself to be highly thermally conductive, the ratio of lamellar crystals is preferably not less than 10 vol %. The ratio of lamellar crystals is more preferably not less than 20 vol %, still more preferably not less than 30 vol %, and particularly preferably not less than 40 vol %.

The liquid crystalline thermoplastic resin in accordance with the present invention preferably contains crystals. In the present invention, crystallinity can be determined by the calculation formula which uses the ratio of the lamellar crystals to the liquid crystalline thermoplastic resin:

Crystallinity (%)=the ratio of the lamellar crystals (Vol %)×0.7

In order to cause the resin itself to be highly thermally conductive, a crystallinity of the liquid crystalline thermoplastic resin is preferably not less than 7%. A crystallinity of the liquid crystalline thermoplastic resin is more preferably not less than 14%, still more preferably not less than 21%, and particularly preferably not less than 28%.

In order to cause the liquid crystalline thermoplastic resin of the present invention to be highly thermally conductive, the resin itself has a density preferably of not less than 1.1 g/cm³, more preferably of not less than 1.13 g/cm³, and particularly preferably of not less than 1.16 g/cm³. The resin having a high density corresponds to a resin which contains a large amount of lamellar crystals, i.e., has a high crystallinity.

The liquid crystalline thermoplastic resin used in the present invention is preferably isotropically highly thermally conductive. A method for determining whether or not the liquid crystalline thermoplastic resin is isotropically thermally conductive is exemplified by a method in which thermal conductivities in respective thickness and plane directions of a disk-shaped sample (1 mm in thickness×Φ25.4 mm) into which the thermoplastic resin is molded are separately measured by a Xe flash method. The thermoplastic resin in accordance with the present invention is isotropically highly thermally conductive, and the thermal conductivities measured by the Xe flash method in the respective thickness and plane directions are not less than 0.3 W/(m·K).

The thermally-conductive organic additive in accordance with the present invention can be produced by any publicly-known method. For simple and easy structural control, the thermally-conductive organic additive is preferably produced by reacting (i) a compound in which the mesogenic group has reactive functional groups at both terminals thereof with (ii) a compound in which the substituent group R has reactive functional groups at both terminals thereof. Examples of such a reactive functional group include publicly-known groups such as a hydroxyl group, a carboxyl group, an alkoxy group, an amino group, a vinyl group, an epoxy group, and a cyano group. A requirement under which such groups react with each other is not particularly limited. For simple and easy synthesis, the thermally-conductive organic additive is preferably produced by reacting (i) a compound in which the mesogenic group has hydroxyl groups at both terminals thereof with (ii) a compound in which the substituent group R has carboxyl groups at both terminals thereof. Alternatively, the thermally-conductive organic additive is preferably produced by reacting (i) a compound in which the mesogenic group has carboxyl groups at both terminals thereof with (ii) a compound in which the substituent group R has hydroxyl groups at both terminals thereof.

The following explains one example of a production method for producing the thermoplastic resin which contains (i) the compound in which the mesogenic group has hydroxyl groups at both terminals thereof and (ii) the compound in which the substituent group R has carboxyl groups at both terminals thereof. The mesogenic group which has hydroxyl groups at both terminals thereof is reacted with a lower fatty acid such as acetic anhydride, thereby converting the hydroxyl groups to ester acetate individually or at one time. Thereafter, the resultant is subjected to a polycondensation reaction for acetic acid elimination with (ii) the compound in which the substituent group R has carboxyl groups at both terminals thereof. The former reaction and the latter reaction may be carried out in one reaction vessel or in different reaction vessels.

The polycondensation reaction is preferably carried out substantially in the presence of no solvent. The reaction temperature, at which the polycondensation reaction is carried out, generally ranges 200° C. to 350° C., preferably 230° C. to 330° C., and particularly preferably 250° C. to 300° C. The polycondensation reaction is preferably carried out in the presence of an inert gas such as nitrogen, under an ordinary pressure or under a reduced pressure, for 0.5 hour to 5 hours. The polycondensation reaction progresses slowly at a too low reaction temperature, whereas a side reaction such as degradation is likely to occur at a too high reaction temperature.

Many phases of reaction temperature can be employed. Alternatively, a reaction product may be immediately taken out and collected in its molten state while the reaction temperature is increasing or when the reaction temperature reaches its maximum. The liquid crystalline thermoplastic resin thus obtained may be used as it is. Alternatively, the liquid crystalline thermoplastic resin thus obtained may be used after an unreacted material is removed from the liquid crystalline thermoplastic resin or the liquid crystalline thermoplastic resin is subjected to solid phase polymerization so that the liquid crystalline thermoplastic resin has a better physical property.

The solid phase polymerization may be carried out as follows: The liquid crystalline thermoplastic resin thus obtained is mechanically crushed into particles whose size is not more than 3 mm, and preferably not more than 1 mm. Then, the particles are preferably treated in a solid-phase state at a temperature in a range of 250° C. to 350° C. in an atmosphere of an inert gas such as nitrogen or under a reduced pressure for 1 hour to 20 hours. Polymer particles whose size is not less than 3 mm, which are insufficiently treated and cause a problem in terms of physical property, are not preferable. It is preferable to select a treatment temperature and a rate of temperature increase so as to prevent a fusion of liquid crystalline thermoplastic resin particles.

Examples of an acid anhydride of a lower fatty acid which acid anhydride is used to produce the thermally-conductive organic additive of the present invention include: acid anhydrides of lower fatty acids having a chain length of 2 to 5 carbon atoms such as acetic anhydride, propionic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, butyric anhydride, isobutyric acid anhydride, valeric acid anhydride, and pivalic acid anhydride. In particular, acetic anhydride, propionic acid anhydride, and trichloroacetic acid anhydride are preferably used. An acid anhydride of a lower fatty acid is used in an equivalent weight of 1.01 time to 1.50 time, and preferably of 1.02 time to 1.2 time with respect to a total amount of hydroxyl groups contained in the mesogenic group to be used. The thermally-conductive organic additive may be produced by another method for causing (i) a compound in which the mesogenic group has carboxyl groups at both terminals thereof and (ii) a compound in which the substituent group R has hydroxyl groups at both terminals thereof to react with each other. The another method is exemplified by a method described in Japanese Patent Application Publication, Tokukaihei, No. 2-258864 A in which method 4,4'-biphenyldicarboxylic acid dimethyl and aliphatic diol are dissolved to be polymerized.

A structure of a terminal of the liquid crystalline thermoplastic resin in accordance with the present invention is not particularly limited. However, for the sake of obtaining a resin suitable for a thermally conductive additive, such as a resin which is less colored, it is preferable that the terminal be terminated with a hydroxyl group, a carboxyl group, an ester group, an acyl group, an alkoxy group, or the like. In a case where the terminal is a highly reactive functional group such as an epoxy group or a maleimide group, the resin is thermosetting thereby being less injection moldable.

The liquid crystalline thermoplastic resin of the present invention may be copolymerized with another monomer, provided that the liquid crystalline thermoplastic resin still can yield its effect. Examples of the another monomer include: aromatic hydroxycarboxylic acid, aromatic dicarboxylic acid, aromatic diol, aromatic hydroxylamine, aromatic diamine, aromatic aminocarboxylic acid, a caprolactam type, a caprolactone type, aliphatic dicarboxylic acid, aliphatic diol, aliphatic diamine, alicyclic dicarboxylic acid, alicyclic diol, aromatic mercaptocarboxylic acid, aromatic dithiol, and aromatic mercaptophenol.

Specific examples of the aromatic hydroxycarboxylic acid include: 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, and 4'-hydroxyphenyl-3-benzoic acid, each of which may or may not be substituted with an alkyl, alkoxy, or halogen.

Specific examples of the aromatic dicarboxylic acid include: terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4''-dicarboxyterphenyl, bis(4-carboxyphenyl)ether, bis(4-carboxyphenoxy)butane, bis(4-carboxyphenyl)ethane, bis(3-carboxyphenyl)ether, and bis(3-carboxyphenyl)ethane, each of which may or may not be substituted with an alkyl, alkoxy, or halogen.

Specific examples of the aromatic diol include: hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ether, bis(4-hydroxyphenyl)ethane, 2,2'-dihydroxybinaphthyl, and the like, each of which may or may not be substituted with an alkyl, alkoxy, or halogen.

Specific examples of the aromatic hydroxyamine include: 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, and 2,2'-diaminobinaphthyl, each of which may or may not be substituted with an alkyl, alkoxy, or halogen.

Specific examples of the aromatic diamine and the aromatic aminocarboxylic acid include: 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenyl methane (methylenedianiline), 4,4'-diaminobiphenyl ether (oxydianiline), 4-aminobenzoic acid, 3-aminobenzoic acid, 6-amino-2-naphthoic acid, and 7-amino-2-naphthoic acid, each of which may or may not be substituted with an alkyl, alkoxy, or halogen.

Specific examples of the aliphatic dicarboxylic acid include: oxalic acid, malonic acid, succinic acid, glutaric acid, adipic acid, pimelic acid, suberic acid, azelaic acid, sebacic acid, dodecanedioic acid, tetradecanedioic acid, fumaric acid, and maleic acid.

Specific examples of the aliphatic diamine include: 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine.

Specific examples of the alicyclic dicarboxylic acid, the aliphatic diol, and the alicyclic diol include: linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, neopentyl glycol, and reactive derivatives of these diols.

Specific examples of the aromatic mercaptocarboxylic acid, the aromatic dithiol, and the aromatic mercaptophenol include: 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and reactive derivatives of these compounds.

The thermally-conductive organic additive (A) in accordance with the present invention is capable of imparting thermal conductivity to an organic polymer (B) by being added and contained in 1 part by weight to 10000 parts by weight with respect to 100 parts by weight of the organic polymer (B). A thermoplastic resin or a thermosetting resin can preferably be used as the organic polymer (B). Both a thermoplastic resin and a thermosetting resin can be used at the same time as the organic polymer (B). The organic polymer (B) may be a synthetic resin or a resin which exists in nature.

<Thermosetting Resin>

A thermosetting resin used as the organic polymer (B) in accordance with the present invention is not particularly limited. According to need, any one kind or any one combination of more than two kinds selected from publicly-known thermosetting resins can be used as the organic polymer (B). The thermosetting resin is exemplified by an epoxy resin, a silicon resin, a cyanate resin, a phenol resin, a polyimide resin, a polyurethane resin, an acrylic resin, a urea resin, and modified resins of these resins, all of which are used conventionally. Note, however, that the thermosetting resin is not limited to these.

<Thermoplastic Resin>

In a case where a thermoplastic resin composition is used as the organic polymer (B) of the present invention, various kinds of thermoplastic resins can be used.

Examples of the thermoplastic resin include: an aromatic vinyl resin such as polystyrene; an acrylic nitrile resin such as polyacrylonitrile; a chlorinated resin such as polyvinylchloride; a polymethacrylic acid ester resin such as polymethyl methacrylate; a polyacrylic acid ester resin; a polyolefin resin such as polyethylene, polypropylene, and a cyclic polyolefin; a polyvinyl ester resin such as polyvinyl acetate, a polyvinyl alcohol resin and resins such as derivatives of these resins; a polymethacrylic acid resin and a polyacrylic acid resin and resins such as metallic salts of polymethacrylic acid or polyacrylic acid; a polyconjugated diene resin; a polymer which is obtained by polymerizing maleic acid and fumaric acid with derivatives of these acid; an amorphous polyester resin such as amorphous semi-aromatic polyester and amorphous fully aromatic polyester; a crystalline polyester resin made from crystalline semi-aromatic polyester and crystalline fully aromatic polyester; a polyamide resin made from aliphatic polyamide, aliphatic-aromatic polyamide, and fully aromatic polyamide; a polycarbonate resin; a polyurethane resin; a polysulfone resin; a polyalkylene oxide resin; a cellulose resin; a polyphenylene ether resin; a polyphenylene sulfide resin; a polyketone resin; a polyimide resin; a polyamide-imide resin; a polyetherimide resin; a polyetherketone resin; a polyetheretherketone resin; polyvinylether resin; a phenoxy resin; a fluorocarbon resin; a silicon resin; a liquid crystal polymer; and random/block/graft copolymer of the exemplified polymers. The thermoplastic resins can be used solely or in combination of two or more kinds. In a case where the thermoplastic resins can be used in combination of two or more kinds, a compatibilizer or the like can be added to the thermoplastic resins, according to need. Of these, the thermoplastic resin (A) which fits the purpose can be appropriately selected.

Of these thermoplastic resins, a thermoplastic resin a part or entire of which is crystalline or liquid crystalline is preferable since (i) an obtained resin composition is likely to be highly thermally conductive and (ii) the thermally-conductive organic additive (A) is easy to be contained in the thermoplastic resin. The thermoplastic resin which is crystalline or liquid crystalline can be entirely crystalline, or only partially crystalline or liquid crystalline, i.e., only a predetermined block in molecules of a block or graft copolymer resin is crystalline or liquid crystalline. The crystallinity of the resin is not particularly limited. A polymer alloy of an amorphous resin and a crystalline or liquid crystalline resin can be used as the thermoplastic resin. The crystallinity of the resin is not particularly limited.

The thermoplastic resin a part or entire of which is crystalline or liquid crystalline encompasses a resin which can be crystallized but exhibits amorphous when it is used solely or it is molded under a specific molding condition. In a case where such a resin is used, it may be possible to crystallize a part or entire of the resin by adjusting an amount of the thermally-conductive organic additive (A) to be added or a way of adding the thermally-conductive organic additive (A), or by reconsidering a molding method, e.g., performing an extension process or a post-crystallization treatment.

A preferred thermoplastic resin which is crystalline or liquid crystalline can be exemplified by a crystalline polyester resin, a crystalline polyamide resin, a polyphenylene sulfide resin, a liquid crystal polymer, a crystalline polyolefin resin, or a polyolefin block copolymer. However, the preferred thermoplastic resin which is crystalline or liquid crystalline is not limited to these and various crystalline resins or liquid crystalline resins can be used.

Specific examples of crystalline polyester includes: polyethylene telephthalate, polypropylene telephthalate, polybutylene telephthalate, polyethylene 2,6-naphthalate, polybutylene naphthalate, poly 1,4 cyclohexylene dimethylene telephthalate, polyethylene 1,2-bis(phenoxy)ethane-4,4'-dicarboxylate, and crystalline copolymer polyester such as polyethylene isophthalate/telephthalate, polybutylene telephthalate/isophthalate, polybutylene telephthalate/decane dicarboxylate, and polycyclohexane dimethylene telephthalate/isophthalate.

Of these crystalline polyester, polyethylene telephthalate, polypropylene telephthalate, polybutylene telephthalate, polyethylene 2,6-naphthalate, polybutylene naphthalate, poly 1,4 cyclohexylene dimethylene telephthalate, or the like, is preferably used in view of molding processability and mechanical properties.

Specific examples of the crystalline polyamide resin include: a ring-opening polymer of cyclic lactam, polycondensate of aminocarboxylic acid, and polycondensate of dicarboxylic acid and diamine. The crystalline polyamide resin is specifically exemplified by aliphatic polyamide such as nylon 6, nylon 4.6, nylon 6.6, nylon 6.10, nylon 6.12, nylon 11, and nylon 12; aliphatic-aromatic polyamide such as poly (meta-xylene adipamide), poly(hexamethylene terephthalamide), poly(hexamethylene isophthalamide), polynonane methylene terephthalamide, poly(tetramethylene isophthalamide), poly(methylpentamethylene terephthalamide); and a copolymer of these substances. Examples of the copolymer include: nylon 6/poly(hexamethylene terephthalamide), nylon 6.6/poly(hexamethylene terephthalamide), nylon 6/nylon 6.6/poly(hexamethylene isophthalamide), poly(hexamethylene isophthalamide)/poly(hexamethylene terephthalamide), nylon 6/poly(hexamethylene isophthalamide)/poly (hexamethylene terephthalamide), nylon 12/poly (hexamethylene terephthalamide), and poly (methylpentamethylene terephthalamide)/poly (hexamethylene terephthalamide). Note that the copolymer can be a random copolymer or a block copolymer, but preferably a random copolymer in view of molding processability.

Of these crystalline polyamide resins, polyamide such as nylon 6, nylon 6.6, nylon 12, nylon 4.6, polynonane methylene terephthalamide, nylon 6/poly(hexamethylene terephthalamide), nylon 66/poly(hexamethylene terephthalamide), nylon 6/nylon 6.6/poly(hexamethylene isophthalamide), poly(hexamethylene isophthalamide)/poly(hexamethylene terephthalamide), nylon 6/poly(hexamethylene isophthalamide)/poly(hexamethylene terephthalamide), nylon 12/poly (hexamethylene terephthalamide), nylon 6/nylon 6.6/poly (hexamethylene isophthalamide), and poly(methyl pentamethylene terephthalamide)/poly(hexamethylene terephthalamide) is preferably used in view of molding processability and mechanical properties.

A liquid crystal polymer is a resin which can form an anisotropic molten phase. A liquid crystal polymer which has an ester bond is preferable. The liquid crystal polymer is specifically exemplified by liquid crystalline polyester which (i) contains a structural unit selected from aromatic oxycarbonyl units, aromatic dioxy units, aromatic and/or aliphatic dicarbonyl units, alkylenedioxy units, and the like, and (ii) forms an anisotropic molten phase; or liquid crystalline polyester amide which (i) contains the aforementioned structural unit and a structural unit selected from aromatic diimino units, aromatic iminoxy units, and the like, and (ii) forms an anisotropic molten phase. Specific examples of liquid crystalline polyester include: liquid crystalline polyester which contains a structural unit formed from p-hydroxybenzoic acid and 6-hydroxy 2-naphthoic acid; liquid crystalline polyester which contains a structural unit formed from p-hydroxybenzoic acid, a structural unit formed from 6-hydroxy 2-naphthoic acid, and a structural unit formed from aromatic dihydroxy compounds and/or aliphatic dicarboxylic acid; liquid crystalline polyester which contains a structural unit formed from p-hydroxybenzoic acid, a structural unit formed from 4,4'-dihydroxyphenyl, and a structural unit formed from aromatic dicarboxylic acid, such as terephthalic acid and isophthalic acid, and/or adipic acid, and aliphatic dicarboxylic acid such as sebacylic acid; liquid crystalline polyester which contains a structural unit formed from p-hydroxybenzoic acid, a structural unit formed from ethylene glycol, and a structural unit formed from terephthalic acid; liquid crystalline polyester which contains a structural unit formed from p-hydroxybenzoic acid, a structural unit formed from ethylene glycol, and a structural unit formed from terephthalic acid and isophthalic acid; liquid crystalline polyester which contains a structural unit formed from p-hydroxybenzoic acid, a structural unit formed from ethylene glycol, a structural unit formed from 4,4'-dihydroxyphenyl, and a structural unit formed from aliphatic dicarboxylic acid such as terephthalic acid and/or adipic acid, and sebacylic acid; and liquid crystalline polyester which contains a structural unit formed from p-hydroxybenzoic acid, a structural unit formed from ethylene glycol, a structural unit formed from aromatic dihydroxy compounds, and a structural unit formed from aromatic dicarboxylic acid such as terephthalic acid, isophthalic acid, and 2,6-naphthalene dicarboxylic acid. Specific examples of liquid crystalline polyester amide include polyester amide which (i) contains p-imino phenoxy unit formed from p-aminophenol, in addition to the structural unit selected from aromatic oxycarbonyl unit, aromatic dioxy unit, aromatic and/or aliphatic dicarbonyl unit, alkylene dioxy unit and the like, and also and (ii) forms an anisotropic molten phase.

Specific examples of the crystalline polyolefin resin include: polyethylene, polypropylene, polybutene, polyisobutylene, and copolymers of these resins and various kinds of olefin compounds. The crystalline polyolefin resin can be a block or graft copolymer of a crystalline resin and an amorphous resin. The block copolymer of these resins is specifically exemplified by SEPS resin, SIS resin, SEBS resin, or SIBS resin. The graft copolymer is specifically exemplified by a resin described in Japanese Patent Application Publication, Tokukai No. 2003-147032.

<Stabilizer>

In order to make the thermally-conductive organic additive (A) in accordance with the present invention more efficient, it is preferable to add, together with the thermally-conductive organic additive (A), a heat stabilizer such as a phenolic stabilizer, sulfuric stabilizer, and phosphoric stabilizer, solely or in combination of two or more kinds. Further, according to need, any other publicly-known components such as a heat stabilizer, a stabilizing auxiliary agent, a lubricant, a mold lubricant, a plasticizing material, a fire retardant, a fire retardant auxiliary agent, an ultraviolet absorption agent, a light stabilizer, a colorant, a dye, an antistatic agent, a conductive additive, a dispersing agent, a compatibilizer, an antibacterial agent can be added to a resin solely or in combination of two or more kinds, provided that the thermally-conductive organic additive continues to yield an effect of the present invention.

<Inorganic Filler>

In order to make the thermally-conductive organic additive in accordance with the present invention more highly thermally conductive, an inorganic filler (C), together with the thermally-conductive organic additive (A), may be added to a resin. The thermally-conductive organic additive (A) and the inorganic filler (C) can be used preferably in a volume ratio of 99:1 to 30:70, more preferably in a volume ratio of 90:10 to 40:60, and particularly preferably in a volume ratio of 80:20 to 50:50. In a case where the inorganic filler (C) is used in a volume ratio of less than 1, assuming that the total volume of (A) and (B) is 100, the thermally-conductive organic additive may be less improved in thermal conductivity. In contrast, in a case where (A) and (C) are used in a volume ratio of 30:70 to 0:100, mechanical properties of the resin may be deteriorated.

A publicly-known inorganic filler can be extensively used as the inorganic filler (C). A thermal conductivity of the inorganic filler (C) itself is not particularly limited. The inorganic filler itself has a thermal conductivity preferably of not less than 0.5 W/(m·K), and more preferably of not less than 1 W/(m·K). From the viewpoint of excellence in thermal conductivity of a composition to be obtained, it is particularly preferable that the inorganic filler (C) be a highly thermally conductive inorganic compound in which the inorganic filler itself has a thermal conductivity of not less than 10 W/(m·K). The highly thermally conductive inorganic compound is used which itself has a thermal conductivity preferably of not less than 12 W/(m·K), more preferably of not less than 15 W/(m·K), most preferably of not less than 20 W/(m·K), and particularly preferably of not less than 30 W/(m·K). An upper limit of the thermal conductivity of the highly thermally conductive inorganic compound itself is not particularly limited. It is preferable that the highly thermally conductive inorganic compound itself have a thermal conductivity as high as possible. The highly thermally conductive inorganic compound is generally used which itself has a thermal conductivity preferably of not more than 3000 W/(m·K), and more preferably of not more than 2500 W/(m·K).

In a case where the highly thermally conductive inorganic compound is used for an application in which an electric insulation property is not particularly required as a molded article, a metal compound, a conductive carbon compound, or the like is preferably used. Of these compounds, conductive carbon materials such as graphite and carbon fiber; conductive metal powder obtained by microparticulating various metals; conductive metal fiber obtained by fibrously processing various metals; and metal oxides such as ferrites and zinc oxide are preferably usable because they have excellent thermal conductivities.

In a case where the highly thermally conductive inorganic compound is used for an application in which an electric insulation property is required as a molded article, a compound which has an electric insulation property is preferably used. Note that having an electric insulation property specifically means having an electric resistance of not less than 1 Ω·cm. It is advantageous to use a compound which has an electric resistance preferably of not less than 10 Ω·cm, more preferably of not less than $10^5$ Ω·cm, still more preferably of not less than $10^{10}$ Ω·cm, and most preferably of not less than $10^{13}$ Ω·cm. An upper limit of the electric resistance is not particularly limited. A compound which has an electric resistance of not more than $10^{18}$ Ω·cm is generally used. It is preferable that a molded article obtained from the highly thermally conductive thermoplastic resin composition of the present invention also have an electric insulation property falling within the above range.

Of the highly thermally conductive inorganic compounds, specific examples of the compound which has an electric insulation property include: metal oxides such as aluminum oxide, magnesium oxide, silicon oxide, beryllium oxide, copper oxide, and cuprous oxide; metal nitrides such as boron nitride, aluminum nitride, and silicon nitride; metal carbides such as silicon carbide; metal carbonates such as magnesium carbonate; insulating carbon materials such as diamond; and metal hydroxides such as aluminum hydroxide and magnesium hydrate. These compounds can be used solely or in combination of two or more kinds.

The highly thermally conductive inorganic compounds can have various shapes. Examples of the various shapes include: particles, fine particles, nanoparticles, agglomerated particles, a tubular shape, a nanotubular shape, a wire shape, a rod shape, a needle shape, a plate shape, an amorphous shape, a rugby ball shape, a hexahedral shape, composite particles in which large particles and microparticles are mixed with each other, and a liquid. Note that these highly thermally conductive inorganic compounds may be natural products or synthetic products. In the case of natural products, where they are come from is not particularly limited and they can be appropriately selected. These highly thermally conductive inorganic compounds can be used solely or in combination of two or more kinds which are different in shape, average particle size, kind, surface treatment agent, and the like.

These highly thermally conductive inorganic compounds, which cause an increase in adhesiveness at an interface between a resin and an inorganic compound and facilitate processability, can be subjected to a surface treatment carried out by use of various surface treatment agents such as a silane treatment agent. A surface treatment agent is not particularly limited, and conventionally publicly known surface treatment agents such as a silane coupling agent and a titanate coupling agent are usable. In particular, a silane coupling agent containing an epoxy group such as epoxy silane, a silane coupling agent containing an amino group such as aminosilane, and a polyoxyethylene silane coupling agent are preferable because they are less likely to cause deterioration in properties of a resin. A method for carrying out a surface treatment with respect to an inorganic compound is not particularly limited, and a general surface treatment method can be employed.

Publicly-known inorganic fillers other than the above-described highly thermally conductive inorganic compound are extensively usable together with the thermally-conductive organic additive of the present invention according to need. Even in a case where the inorganic compound which has a relatively low thermal conductivity of less than 10 W/(m·K) is used, the resin composition is highly thermally conductive because the resin per se is highly thermally conductive. Examples of an inorganic filler other than the highly thermally conductive inorganic compound include: diatomite powder; basic magnesium silicate; calcined clay; micronized silica; quartz powder; crystalline silica; kaolin; talc; antimony trioxide; micronized mica; molybdenum disulfide; rock wool; ceramic fiber; inorganic fiber such as asbestos; and glass fillers such as glass fiber, glass powder, glass cloth, and molten silica. Use of such a filler allows an increase in property such as thermal conductivity, mechanical strength, or abrasion resistance which is suitable for practical use of the resin composition. Further, according to need, an organic filler such as paper, pulp, and wood material; synthetic fibers such as polyamide fiber, aramid fiber, and boron fiber; and resin powder such as polyolefin powder can be blended in combination.

Further, according to need, any other component such as a reinforcer, a thickener, a mold release, a coupling agent, a flame retarder, a flame-resistant agent, a pigment, a coloring agent, and other auxiliary agents can be added to the thermally-conductive organic additive of the present invention as an additive other than the resin and the filler which are mentioned above, or can be used together with the thermally-conductive organic additive, provided that the thermally-conductive organic additive continue to yield an effect of the present invention. Such an additive is generally added in 0 part by weight to 20 parts by weight in total with respect to 100 parts by weight of the thermally-conductive organic additive.

A method for producing the liquid crystalline thermoplastic resin composition of the present invention is not particularly limited. For example, the liquid crystalline thermoplastic resin composition can be produced as follows: Components, an additive, and/or the like mentioned above are dried, so as to be subjected to melt-kneading by use of a melt-kneading machine such as a single screw extruder or a double screw extruder. Note that, in a case where a blended component is a liquid, it is also possible to produce the liquid crystalline thermoplastic resin composition by adding, in the middle of the melt-kneading, the liquid into the melt-kneading machine by use of a liquid supply pump or the like.

The thermally-conductive organic additive of the present invention is particularly usable for an injection-molded article, a blow molded article, or an extrusion molded article, since the thermally-conductive organic additive is excellently thermally conductive, and provides such molded articles with a good external appearance. An appropriate molding method is injection molding, blow molding, or extrusion molding, however, the methods of using and molding the thermally-conductive organic additive are not limited to these. And the thermally-conductive organic additive can be used in various forms of molded articles. Examples of such various forms of molded articles include: a resin film, a resin molded article, a resin foam, a paint, and a coating material.

As a method for molding the thermally-conductive organic additive of the present invention, injection molding, blow molding, extrusion molding, vacuum molding, press molding, and calendar molding, and the like are usable. Since the highly thermally conductive thermoplastic resin composition obtained in the present invention has an excellent moldability, the highly thermally conductive thermoplastic resin composition can be molded by use of a molding machine for thermoplastic resins which is currently extensively used, and can also be easily molded into a product which has a complicated shape.

The thermally-conductive organic additive of the present invention can be extensively used for various applications such as an electronic material, a magnetic material, a catalytic material, a structure material, an optical material, a medical material, an automotive material, and an architectural material. Particularly because the thermally-conductive organic additive of the present invention has excellent properties of providing the molded article with a remarkable external appearance and a high thermal conductivity, the thermally-conductive organic additive is extremely useful as a heat radiation and heat conduction resin material.

The thermally-conductive organic additive of the present invention is preferably usable for injection-molded articles of home electric appliances, OA equipment parts, AV equipment parts, automotive exterior and interior parts, and the like. The thermally-conductive organic additive of the present invention is particularly preferably usable as an exterior material in electric appliances and OA equipment in each of which a large amount of heat is generated. Further, in an electronic device in which a heating source is provided but it is difficult to cause a fan or the like to carry out forced cooling, the thermally-conductive organic additive of the present invention is preferably usable as an exterior material of such an electronic device so that heat generated inside the electronic device is radiated outside the electronic device. In particular, the thermally-conductive organic additive of the present invention is extremely useful as a resin for cases, housings, or external materials preferably of a portable computer such as a laptop personal computer and small-sized or portable electronic devices such as a PDA, a mobile phone, a portable game machine, a portable music player, a portable TV/video device, and a portable video camera. The thermally-conductive organic additive of the present invention is also extremely useful as a resin for battery peripheral equipment of an automobile, an electric train, and the like, a resin for portable batteries of home electric appliances, a resin for power distribution parts such as a breaker, a sealing material for a motor, and the like.

The thermally-conductive organic additive of the present invention, in which the highly thermally conductive inorganic compound can be contained in a reduced amount, has more excellent molding processability as compared to a conventionally well-known composition. The thermally-conductive organic additive thus has properties useful as parts or housings for the foregoing applications.

<Composition>

The present invention encompasses, in addition to the thermally-conductive organic additive described above, a resin composition which contains the thermally-conductive organic additive.

That is, the resin composition in accordance with the present invention includes:

(A) a liquid crystalline thermoplastic resin which has a mainly-chain structure, wherein a main chain of the liquid crystalline thermoplastic resin contains mainly a repeating unit represented by the general formula (1):

-M-Sp-      (1)

wherein M represents a mesogenic group; and Sp represents a spacer, the liquid crystalline thermoplastic resin per se having a thermal conductivity of not less than 0.45 W/(m·K);

(B) a thermoplastic resin other than the liquid crystalline thermoplastic resin (A); and (C) an inorganic filler;

wherein (A) and (B) are contained in a weight ratio of 10:90 to 90:10 in the resin composition.

The component (A) is the liquid crystalline thermoplastic resin as early described, the component (B) is the thermosetting resin or the thermoplastic resin both of which are as early described, and the component (C) is the inorganic filler as early described.

The components (A) and (B) are preferably contained in the resin composition of the present invention, in a weight ratio of 10:90 to 90:10, more preferably in a weight ratio of 15:85 to 80:20, still more preferably in a weight ratio of 20:80 to 70:30, and most preferably in a weight ratio of 25:75 to 60:40.

Further, the present invention relates to a cured product obtained from the composition in which the component (B) is a thermosetting resin. The thermosetting resin is at least one kind of thermosetting resin which is selected from an epoxy resin, an acrylic cured resin, a guanamine resin, a diallyl phthalate resin, a phenol resin, a maleic acid resin, a melamine resin, a urea resin, a furan resin, an alkyd resin, and an unsaturated polyester resin.

Epoxy resin used in the present invention is a resin which contains, as a main component, a polymer obtained by a ring-opening reaction of a compound containing at least two or more epoxy rings in a molecule. The compound is generally exemplified by a product obtained by condensation of epichlorohydrin and bisphenol-A. As a curing agent, amine such as ethylenediamine, diethylenetriamine, triethylene tetramine, tetraethylene pentamine, metaphenilenediamine, diaminophenylsulfone; acid anhydride such as methylnadic anhydride, and hexahydro acid anhydride; a urea resin; a melamine resin; a phenol resin, or the like can be used. Furthermore, examples of the epoxy resin includes: an alicyclic epoxy resin, a brominated epoxy resin, an aliphatic epoxy resin, and a polyfunctional epoxy resin.

The acrylic cured resin used in the present invention is a resin which has, at both terminals thereof, reactive groups capable of thermosetting. Examples of the acrylic cured resin include KANEKA XMAP RC-100C produced by KANEKA CORPORATION.

The guanamine resin used in the present invention is a resin which contains, as a main component, a polymer obtained by an added condensation reaction of guanamine and an aldehyde. The guanamine resin is generally exemplified by a resin containing benzoguanamine and formic aldehyde. Examples of the guanamine resin further include: a resin in which guanamine is co-reacted or co-condensed with urea, melamine, thiourea, or the like; and a resin in which guanamine is etherealized with butanol, methanol, or the like.

The diallyl phthalate resin used in the present invention is a cured homopolymer or a cured copolymer which contains diallyl phthalate as a main component. Examples of a monomer with which the diallyl phthalate is copolymerized include: styrene, α-methyl styrene, acrylic ester, and methacrylate.

The phenol resin used in the present invention is a resin which contains, as a main component, a polymer obtained from a condensation reaction of phenol and aldehyde. A polymer is preferable which contains (i) phenol, m-cresol, 3,5-xylenol, p-alkylphenol, resorcin, or the like; and (ii) formic aldehyde. The phenol resin can be condensed by a condensation reaction catalyzed with a normal acid catalyst or a basic catalyst. A curing agent such as hexamethylene tetramine, or a filler such as wood flour, pulp, and an aggregating material can be used according to need.

The melamine resin used in the present invention is a resin which contains, as a main component, a polymer obtained by an added condensation reaction of melamine and aldehyde. The aldehyde to be used is generally formic aldehyde. The melamine resin encompasses a melamine resin which is co-condensed with urea or the like. The melamine resin is generally thermosetting. However, according to need, a curing agent can be used.

The urea resin used in the present invention is a resin which contains, as a main component, a polymer obtained by a condensation reaction of urea and aldehyde. The aldehyde to be used is generally formic aldehyde. The urea resin encompasses a urea resin which is co-condensed with thiourea, melamine, phenol, or the like. Cellulose or the like can be mixed in the melamine resin and the urea resin according to need.

The furan resin used in the present invention is a resin which contains, as a main component, a polymer obtained solely from furfuryl alcohol, or obtained by a condensation reaction of furfuryl alcohol and formic aldehyde. Examples of the furan resin include: a furfuryl alcohol/furfural co-condensation resin, a furfuryl alcohol resin, a furfural/phenol co-condensation resin, a furfural/ketone co-condensation resin, a furfuryl alcohol/urea copolymer resin, and a furfuryl alcohol/phenol co-condensation resin.

The alkyd resin used in the present invention is a resin which contains, as a main component, a polymer obtained by a condensation reaction of polybasic acid and polyhydric alcohol. Generally, the polybasic acid to be used is phthalic anhydride, phthalic acid, maleic acid, fatty oil, fatty acid, rosin, ester rosin, or the like, and the polyhydric alcohol to be used is glycerin.

In the present invention, the thermosetting resins mentioned above can be used, solely or in combination of two or more kinds, depending on the circumstances. Moreover, the above-described thermosetting resin can be used together with a thermosetting resin such as unsaturated polyester and polyurethane.

The curing of the composition of the present invention can be performed by methods of heating or not-heating the composition, with or without a curing agent or an accelerator, or by a method of irradiating the composition with ultraviolet.

Furthermore, the present invention includes following 2) through 15):

2) The thermally-conductive organic additive as set forth in 1), wherein the liquid crystalline thermoplastic resin contains mainly a repeating unit represented by the general formula (2):

$$-A^1-x-A^2-y-R-z- \qquad (2)$$

wherein each of $A^1$ and $A^2$ independently represents a substituent group selected from an aromatic group, a condensed aromatic group, an alicyclic group, and an alicyclic heterocyclic group; each of x, y and z independently represents a direct bond, or a bivalent substituent group selected from the group consisting of —$CH_2$—, —$C(CH_3)_2$—, —O—, —S—, —$CH_2$—$CH_2$—, —C=C—, —C≡C—, —CO—, —CO—O—, —CO—NH—, —CH=N—, —CH=N—N=CH—, —N=N—, and —N(O)=N—; and R represents a bivalent substituent group which has a main chain length of 2 to 20 atoms and may be branched.

3) The thermally-conductive organic additive as set forth in 2), wherein -$A^1$-x-$A^2$- of the liquid crystalline thermoplastic resin is a mesogenic group represented by the general formula (3):

[Chem. 2]

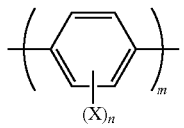

$$\qquad (3)$$

wherein X independently represents an aliphatic hydrocarbon group, F, Cl, Br, I, CN, or $NO_2$; n is an integer of 0 to 4; and m is an integer of 2 to 4.

4) The thermally-conductive organic additive as set forth in 2) or 3), wherein R of the liquid crystalline thermoplastic resin is a linear aliphatic hydrocarbon chain.

5) The thermally-conductive organic additive as set forth in 4), wherein R of the liquid crystalline thermoplastic resin has a main chain length of even-numbered carbon atoms.

6) The thermally-conductive organic additive as set forth in 4), wherein R of the liquid crystalline thermoplastic resin is of at least one kind selected from —$(CH_2)_8$—, —$(CH_2)_{10}$—, and —$(CH_2)_{12}$—, the liquid crystalline thermoplastic resin having a number average molecular weight of 3000 to 40000.

7) The thermally-conductive organic additive as set forth in 2), wherein -y-R-z- of the liquid crystalline thermoplastic resin is —O—CO—R—CO—O—.

8) A thermally-conductive organic additive containing resin composition including a thermally-conductive organic additive (A) as set forth in any one of 1) through 7) and an organic polymer (B), wherein the thermally-conductive organic additive (A) is added in 1 part by weight to 10000 parts by weight with respect to 100 parts by weight of the organic polymer (B).

9) The thermally-conductive organic additive as set forth in 1), wherein the liquid crystalline thermoplastic resin contains lamellar crystals by not less than 10 Vol %.

10) The thermally-conductive organic additive as set forth in 1), wherein the liquid crystalline thermoplastic resin has a crystallinity of not less than 7 Vol %.

11) A resin composition including:

(A) a liquid crystalline thermoplastic resin having a mainly-chain structure, wherein a main chain of the liquid crystalline thermoplastic resin contains mainly a repeating unit represented by the general formula (1):

$$-M-Sp- \qquad (1)$$

wherein M represents a mesogenic group; and Sp represents a spacer;

(B) a thermoplastic resin other than the liquid crystalline thermoplastic resin (A); and (C) an inorganic filler, wherein (A) and (B) are contained in a weight ratio of 10:90 to 90:10 in the resin composition.

12) The resin composition as set forth in 11), wherein the liquid crystalline thermoplastic resin (A) contains lamellar crystals by not less than 10 Vol %.

13) The resin composition as set forth in 11), wherein the liquid crystalline thermoplastic resin (A) has a crystallinity of not less than 7 Vol %.

14) A resin composition including:

(A) a thermally-conductive organic additive including a liquid crystalline thermoplastic resin which has a mainly-chain structure, wherein a main chain of the liquid crystalline thermoplastic resin contains mainly a repeating unit represented by the general formula (1):

$$-M-Sp- \qquad (1)$$

wherein M represents a mesogenic group; and Sp represents a spacer;

(B) a thermosetting resin; and (C) an inorganic filler.

15) A cured product obtained from a resin composition of 14).

Furthermore, the present invention can of course include another aspect such as the use of the liquid crystalline thermoplastic resin of the present invention as the thermally-conductive organic additive, and a method for improving thermal conductivity of an organic material which uses the liquid crystalline thermoplastic resin of the present invention.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention and the scope of the patent claims set forth below.

EXAMPLES

The following description more specifically discusses the thermoplastic resin and the resin composition of the present invention with reference to Examples and Comparative Examples. The present invention is not limited only to the Examples. Note that reagents produced by Wako Pure Chemical Industries, Ltd. were used as reagents described below if not otherwise specified. Note that a thermoplastic resin can be produced with reference to Journal of Polymer Science: Polymer Physics Edition, Vol. 21, 1119-1131 (1983).

[Evaluation Method]

<Measurement of Thermophysical Property>

Thermophysical properties were measured by Differential Scanning calorimetry (Shimadzu Corporation; Shimadzu DSC-50) at a rate of temperature increase of 10° C./min, and a temperature at which a highest peak of heat absorption was obtained was assumed to be a melting point.

<Molding of Test Piece>

Obtained samples were dried and then molded into samples (6 mm in thickness×Φ20 mm) by an injection molding machine for measurement of thermal conductivities. Further, disk-shaped samples (1 mm in thickness×Φ25.4 mm) were molded for checking anisotropies of thermal conductivities of thin molded articles.

<TEM Observation>

Parts of the respective molded samples (6 mm in thickness×Φ20 mm) were cut out, so as to be dyed with $RuO_4$. Then, ultrathin slices which have a thickness of 0.1 μm were prepared by a microtome. The ultrathin slices thus prepared were observed by TEM at an acceleration voltage of 100 kV.

<Ratio of Lamellar Crystals>

A photograph with 40,000×scale (20 cm×25 cm) which photograph had been obtained by TEM observation was used to determine a lamellar crystal region. A boundary of the lamellar crystal region was determined assuming that the lamellar crystal region is a region in which a periodic change occurs. Given that lamellar crystals are distributed also in a thickness direction, the ratio of lamellar crystals to a resin was found as a ratio of the lamellar crystal region to a total area of the photograph.

<Crystallinity>

Crystallinity is determined from the ratio of the lamellar crystals by use of the calculation formula below:

Crystallinity (%)=the ratio of the lamellar crystals (Vol %)×0.7

<Thermal Conductivity>

Thermal conductivities of samples (6 mm in thickness×Φ20 mm) were measured by use of a sensor of Φ 4 in a hot disk method thermal conductivity measuring device produced by KYOTO ELECTRONICS MANUFACTURING CO., LTD. The thermal conductivities thus measured were obtained by averaging anisotropies to directions of thermal conduction. A laser light absorbing spray (Blackguard spray FC-153, produced by Fine Chemical Japan Co., LTD.) was applied to surfaces of disk-shaped samples (1 mm in thickness×Φ25.4 mm), so that the disk-shaped samples were dried. Thereafter, thermal conductivities of the respective disk-shaped samples were measured in thickness and plane directions of the respective disk-shaped samples by use of a Xe flash analyzer LFA447 NANOFLASH (produced by NETZSCH Inc.).

<Density>

Densities of disk-shaped samples (6 mm in thickness×Φ 20 mm) were measured by an underwater substitution method.

<Measurement of Number Average Molecular Weight>

A sample solution was prepared by dissolving the thermoplastic resin of the present invention in a 1:2 (vol %) mixed solvent of p-chlorophenol and o-dichlorobenzene so that the sample solution has a concentration of 0.25 wt %. Polystyrene [sold by Chemco Scientific Co., Ltd.; molecular weight (Mw/Mn): 390,000(1.06), 200,000(1.06), 65,000(1.06), 30,000(1.06), 3,350(1.10), 1,241(1.07)] was used as a reference material, so as to prepare a similar sample solution. A number average molecular weight of the thermoplastic resin was measured by high-temperature GPC (150-CV, produced by Waters Corporation) under the conditions of INJECTOR COMP: 80° C., COLUMN COMP: 80° C., PUMP/SOLVENT COMP: 60° C., Injection Volume: 200 μl, flow rate: 0.7 ml/min. A differential refractometer (RI) was used as a detector.

Two organic solvent GPC columns (HT-804, produced by SHOWA DENKO K.K.; theoretical plate number: not less than 18,000; exclusion limit molecular weight: 400,000; particle size: 7 μm) were connected in series for use as a GPC column.

Production Example 1

4,4'-dihydroxyphenyl, tetradecanedioic acid, and acetic anhydride were placed in a molar ratio of 1:1.05:2.1 in a sealed reactor vessel. An acetylated reaction was carried out under an ordinary pressure in an atmosphere of nitrogen gas at 150° C. for 3 hours. Then, polycondensation was conducted in the vessel heated to 265° C. at a rate of temperature increase of 1° C./min. When an amount of distillate acetic acid reached 90% of a theoretical yield of acetic acid, approximately 20 minutes were spent to decompress the vessel to not more than 1.0 torr with the temperature maintained at 265° C., so as to carry out melt polymerization until the polymer was grown to a high molecular weight. After one hour, the pressure inside the vessel was brought back to an ordinary pressure with an inert gas, and then a generated polymer was collected. The polymer thus obtained was dissolved in a solvent of p-chlorophenol and o-dichlorobenzene mixed in a ratio of 1:2 (vol %) so that the polymer thus obtained has a concentration of 0.25 wt %. A number average molecular weight of the polymer was measured by high-temperature GPC (150-CV, produced by Waters Corporation) under the conditions of INJECTOR COMP: 80° C., COLUMN COMP: 80° C., PUMP/SOLVENT COMP: 60° C., and Injection Volume: 200 μl, assuming that polystyrene was a reference material. The result showed that a number average molecular weight of the polymer was 8500 and a weight average molecular weight was 18800.

The polymer thus obtained was press-molded at 240° C. into two cylinder-shaped test pieces (Φ 30 mm×2.5 mm in thickness), and thermal conductivities of the test pieces were measured by use of a sensor of Φ 4 in a hot disk method thermal conductivity measuring device produced by KYOTO ELECTRONICS MANUFACTURING CO., LTD. The thermal conductivities thus measured were 1.36 W/(m·K). The polymer thus obtained was used as a thermally-conductive organic additive (A1).

Production Example 2

4,4'-dihydroxyphenyl, dodecanedioic acid, and acetic anhydride were placed in a molar ratio of 1:1.05:2.1 in a sealed reactor vessel. An acetylated reaction was carried out under an ordinary pressure in an atmosphere of nitrogen gas at 150° C. for 3 hours. Then, polycondensation was conducted in the vessel heated to 260° C. at a rate of temperature increase of 1° C./min. When an amount of distillate acetic acid reached 90% of a theoretical yield of acetic acid, approximately 20 minutes were spent to decompress the vessel to not more than 1.0 torr with the temperature maintained at 260° C., so as to carry out melt polymerization until the polymer was grown to a high molecular weight. After one hour, the pressure inside the vessel was brought back to an ordinary pressure with an inert gas, and then a generated polymer was collected. The polymer thus obtained was dissolved in a solvent of p-chlorophenol and o-dichlorobenzene mixed in a ratio of 1:2 (vol %) so that the polymer thus obtained has a concentration of 0.25 wt %. A number average molecular weight of the polymer was measured by high-temperature GPC (150-CV, produced by Waters Corporation) under the conditions of INJECTOR COMP: 80° C., COLUMN COMP: 80° C., PUMP/SOLVENT COMP: 60° C., and Injection Volume: 200 μl, assuming that polystyrene was a reference material. The result showed that a number average molecular weight of the polymer was 9050 and weight average molecular weight was 25100.

The polymer thus obtained was press-molded at 230° C. into two cylinder-shaped test pieces (Φ 30 mm×2.5 mm in thickness), and thermal conductivities of the test pieces were measured by use of a sensor of Φ 4 in a hot disk method thermal conductivity measuring device produced by KYOTO ELECTRONICS MANUFACTURING CO., LTD. The thermal conductivities thus measured were 1.24 W/(m·K). The polymer thus obtained was used as a thermally-conductive organic additive (A2).

[Evaluation Method]

Thermal conductivity: Two cylinder-shaped test pieces (Φ 30 mm×2.5 mm in thickness) were cut out from the molded article thus obtained and thermal conductivities of the cylinder-shaped test pieces ware measured by use of a sensor of Φ 4 in a hot disk method thermal conductivity measuring device produced by KYOTO ELECTRONICS MANUFACTURING CO., LTD.

Example 1

100 parts by weight of the thermally-conductive organic additive (A1) synthesized in Production Example 1; 100 parts by weight of polyethylene terephthalate (BELLPET EFG-70, produced by Bell Polyester Products, Inc.) which serves as an organic polymer (B); 0.2 parts by weight of AO-60 (produced by ADEKA CORPORATION) which is a phenolic stabilizer; and 0.2 parts by weight of HP-10 (produced by ADEKA CORPORATION) which is a phosphite stabilizer were added and mixed in a Henschel mixer. Then the mixture was introduced via a hopper into a double screw extruder KZW15-45 (produced by TECHNOVEL CORPORATION) in which two screws were directed in the same direction in engagement with each other, the hopper being provided near the foot of the screws of the extruder. A temperature of the extruder was set to 200° C. in the vicinity of a supply port and to be higher gradually along the extruder, so that a temperature around a top of the extruder screws was 270° C. A resin composition was obtained under such conditions. The resin composition thus obtained was molded into disk-shaped samples (6 mm in thickness×Φ 20 mm) by an injection molding machine and thermal conductivities of the samples were measured. The thermal conductivities were 0.78 W/(m·K).

Comparative Example 1

In Comparative Example 1, thermal conductivities were measured as in Example 1, except that polyethylene terephthalate (BELLPET EFG-70, produced by Bell Polyester Products, Inc.) as an organic polymer (B) was solely used and no thermally-conductive organic additive (A) was used. The thermal conductivities were 0.21 W/(m·K).

Example 2

100 parts by weight of the thermally-conductive organic additive (A1) synthesized in Production Example 1; 100 parts by weight of polyethylene terephthalate (BELLPET EFG-70, produced by Bell Polyester Products, Inc.) which serves as an organic polymer (B); 0.2 parts by weight of AO-60 (produced by ADEKA CORPORATION) which is a phenolic stabilizer; 0.2 parts by weight of HP-10 (produced by ADEKA CORPORATION) which is a phosphite stabilizer; and 100 parts by weight of boron nitride powder (h-BN) (PT110, produced by Momentive Performance Materials Inc.; a thermal conductivity per se: 60 W/(m·K); a volume average particle size: 45 μm; electrically insulative, a volume resistivity: $10^{14}$ Ω·cm) which is an inorganic filler were mixed in a Henschel mixer. Then the mixture was introduced via a hopper into a double screw extruder KZW15-45 (produced by TECHNOVEL CORPORATION) in which two screws were directed in the same direction in engagement with each other, the hopper being provided near the foot of the screws of the extruder. A temperature of the extruder was set to 200° C. in the vicinity of a supply port and to be higher gradually along the extruder, so that a temperature around a top of the extruder screws was 280° C. A resin composition was obtained under such conditions. The resin composition thus obtained was molded into disk-shaped samples (6 mm in thickness×Φ 20 mm) by an injection molding machine and thermal conductivities of the samples were measured. The thermal conductivities were 3.38 W/(m·K).

Comparative Example 2

In Comparative Example 2, thermal conductivities were measured as in Example 2, except that polyethylene terephthalate (BELLPET EFG-70, produced by Bell Polyester Products, Inc.) as a thermoplastic resin was solely used and no thermally-conductive organic additive (A) was used. The thermal conductivities were 1.05 W/(m·K).

As shown above, thermal conductivity of the organic polymer can be improved by adding the thermally-conductive organic additive in accordance with the present invention to an organic polymer. Since the thermally-conductive organic additive in accordance with the present invention has thermoplasticity in contrast to conventionally known inorganic fillers, the thermally-conductive organic additive does not significantly increase viscosity of the resin composition and can suppress density of the resin composition. Further, the thermally-conductive organic additive does not deteriorate mold abrasion property and electrical insulation property of the composition. Such a resin composition is industrially very useful because the resin composition (i) is usable as a heat radiation and heat conduction resin material for various fields such as electric and electronic industries and an automotive field, and (ii) can contribute to weight reduction of apparatus and devices.

Example 3

90 parts by weight of the thermally-conductive organic additive (A1) synthesized in Production Example 1, 10 parts by weight of nylon 6 (A1020BRL, produced by UNITIKA Ltd.) which serves as an organic polymer (B); and 0.2 parts by weight of AO-50 (produced by ADEKA CORPORATION) which is a phenolic stabilizer were sufficiently mixed. Then the mixture was introduced via a hopper into a double screw extruder KZW15-45 (produced by TECHNOVEL CORPORATION) in which two screws were directed in the same direction in engagement with each other, the hopper being provided near the foot of the screws of the extruder. A temperature of the extruder was set to 200° C. in the vicinity of a supply port and to be higher gradually along the extruder, so that a temperature around a top of the extruder screws was 260° C. A resin composition was obtained under such conditions. The resin composition thus obtained was molded into disk-shaped samples (6 mm in thickness×Φ 20 mm) by an injection molding machine and thermal conductivities of the samples were measured. The thermal conductivities were 0.96 W/(m·K).

Example 4

In Example 4, thermal conductivities were measured as in Example 3, except that 70 parts of by weight, instead of 90 parts by weight, of the thermally-conductive organic additive (A1) was used and 30 parts by weight, instead of 10 parts by weight, of the organic polymer (B) was used. The thermal conductivities were 0.76 W/(m·K).

Example 5

In Example 5, thermal conductivities were measured as in Example 3, except that 50 parts by weight, instead of 90 parts by weight, of the thermally-conductive organic additive (A1) was used, and 50 parts by weight, instead of 10 parts by weight, of the organic polymer (B) was used. The thermal conductivities were 0.66 W/(m·K).

Comparative Example 3

In Comparative Example 3, thermal conductivities were measured as in Example 3, except that nylon 6 (A1020BRL, produced by UNITIKA Ltd.) as the organic polymer (B) was solely used and no thermally-conductive organic additive (A) was used. The thermal conductivities were 0.22 W/(m·K).

Example 6

90 parts by weight of the thermally-conductive organic additive (A2) synthesized in Production Example 2; 10 parts by weigh of a commercially available liquid crystal polymer (A-8100, produced by Ueno Fine Chemicals Industry, LTD.; melting point: 219° C.; coagulation temperature: 173° C.) which serves as an organic polymer (B); 0.2 parts by weight of AO-50 (produced by ADEKA CORPORATION) which is a phenolic stabilizer were sufficiently mixed. Then, the mixture was introduced via a hopper into a double screw extruder KZW15-45 (produced by TECHNOVEL CORPORATION) in which two screws were directed in the same direction in engagement with each other, the hopper being provided near the foot of the screws of the extruder. A temperature of the extruder was set to 200° C. in the vicinity of a supply port and to be higher gradually along the extruder, so that a temperature around a top of the extruder screws was 260° C. A resin composition was obtained under such conditions. The resin composition thus obtained was molded into disk-shaped samples (6 mm in thickness×Φ 20 mm) by an injection molding machine and thermal conductivities of the samples were measured. The thermal conductivities were 0.95 W/(m·K).

Example 7

In Example 7, thermal conductivities were measured as in Example 6, except that 70 parts by weight, instead of 90 parts by weight, of the thermally-conductive organic additive (A2) was used, and 30 parts by weight, instead of 10 parts by weigh, of the organic polymer (B) was used. The thermal conductivities were 0.57 W/(m·K).

Example 8

In Example 8, thermal conductivities were measured as in Example 6, except that 50 parts by weight, instead of 90 parts by weight, of the thermally-conductive organic additive (A2) was used and 50 parts by weight, instead of 10 parts by weight, of the organic polymer (B) was used. The thermal conductivities were 0.46 W/(m·K).

Comparative Example 4

In Comparative Example 4, thermal conductivities were measured as in Example 6, except that the commercially available liquid crystal polymer (A-8100, produced by Ueno Fine Chemicals Industry, LTD.) as the organic polymer (B) was solely used and no thermally-conductive organic additive (A) was used. The thermal conductivities were 0.18 W/(m·K).

Example 9

100 parts by weight of the thermally-conductive organic additive (A1) powder synthesized in Production Example 1; 70 parts by weight of a commercially available epoxy resin (EPIKOTE 828, produced by Japan Epoxy Resin Co. Ltd.) which serves as an organic polymer (B); 30 parts by weight of an epoxy curing agent (ST-12, produced by Japan Epoxy Resin Co. Ltd.); 0.2 parts by weight of AO-50 (produced by ADEKA CORPORATION) which is a phenolic stabilizer were sufficiently mixed by use of a mixer at a room temperature. Then, the mixture was filled in disk-shaped molds each of which has 6 mm in thickness×Φ 20 mm, and heated and cured at 150° C., so as to be molded into samples. Thermal conductivities of the samples were measured. The thermal conductivities were 0.56 W/(m·K).

Comparative Example 5

In Comparative Example 5, thermal conductivities were measured as in Example 9, except that 70 parts by weight of the commercially available epoxy resins (commercially available epoxy resins (EPIKOTE 828, produced by Japan Epoxy Resin Co. Ltd.) which serves as an organic polymer (B) and 30 parts by weight of the epoxy curing agent (ST-12, produced by Japan Epoxy Resin Co. Ltd.) were solely used, and no thermally-conductive organic additive (A) was used. The thermal conductivities were 0.19 W/(m·K).

Example 10

100 parts by weight of the thermally-conductive organic additive (A1) powder produced by Production Example 1; 100 parts by weight of an acrylic cured resin (KANEKA XMAP RC-100C, produced by KANEKA CORPORATION) which serves as an organic polymer (B); 3 parts by weight of a curing agent (NIPER BW, produced by NOF CORPORATION); 0.2 parts by weight of AO-60 (produced by ADEKA CORPORATION) which is a phenolic stabilizer were sufficiently mixed by use of a mixer at a room temperature. Then, the mixture was filled in disk-shaped molds each of which has 6 mm in thickness×Φ 20 mm, and heated and cured at 150° C., so as to be molded into samples. Thermal conductivities of the samples were measured. The thermal conductivities were 0.50 W/(m·K).

Comparative Example 6

In Comparative Example 6, thermal conductivities were measured as in Example 10, except that 100 parts by weight of the acrylic cured resin (KANEKA XMAP RC-100C, produced by KANEKA CORPORATION) which serves as an organic polymer (B); 3 parts by weight of the curing agent (NIPER BW, produced by NOF CORPORATION) were solely used and no thermally-conductive organic additive (A) was used. The thermal conductivities were 0.18 W/(m·K).

Example 11

4,4'-dihydroxyphenyl, sebacic acid, and acetic anhydride were placed in a molar ratio of 1:1.05:2.2 in a sealed reactor vessel provided with a reflux condenser, a thermometer, a nitrogen introduction tube, and a stirring rod. Antimony oxide was used as a catalyst, and the temperature was raised to a reflux temperature while the contents were being stirred in gentle nitrogen gas stream. After the contents were kept warm at the reflux temperature for 5 hours, the reflux condenser was replaced with a Liebig condenser. Then, acetic acid was distilled away while the temperature was being raised to 200° C. Further, the temperature was raised to 300° C. at a rate of 1° C./min, and polymerization was carried out for 1 hour and 30 minutes while acetic acid generated at 300° C. was being distilled away. When an amount of distillate acetic acid reached 90% of a theoretical yield of acetic acid, approximately 20 minutes were spent to decompress the vessel to not more than 0.5 torr with the temperature maintained at 300° C., so as to carry out melt polymerization until the polymer was grown to a high molecular weight. After one hour, the pressure inside the vessel was brought back to an ordinary pressure with an inert gas and then a generated polymer was collected. The polymer thus obtained was melted at 230° C., so as to obtain, by injection molding, (i) a sample (6 mm in thickness×Φ 20 mm) and (ii) a disk-shaped sample (1 mm in thickness×Φ 25.4 mm).

Example 12

4,4'-dihydroxyphenyl, sebacic acid, p-hydroxybenzoic acid, and acetic anhydride were placed in a molar ratio of 1:1:3.5:6 in a sealed reactor vessel provided with a reflux condenser, a thermometer, a nitrogen introduction tube, and a stirring rod. The temperature was raised to a reflux temperature while the contents were being stirred in gentle nitrogen gas stream. After the contents were kept warm at the reflux temperature for 5 hours, the reflux condenser was replaced with a Liebig condenser. Then, acetic acid was distilled away while the temperature was being raised to 200° C. Further, the temperature was raised to 320° C. at a rate of 1° C./min, and polymerization was carried out for 1 hour and 30 minutes while acetic acid generated at 320° C. was being distilled away. When an amount of distillate acetic acid reached 90% of a theoretical yield of acetic acid, approximately 20 minutes were spent to decompress the vessel to not more than 0.5 torr with the temperature maintained at 320° C., so as to carry out melt polymerization until the polymer was grown to a high molecular weight. After one hour, the pressure inside the vessel was brought back to an ordinary pressure with an inert gas and then a generated polymer was collected. The polymer thus obtained was melted at 230° C., so as to obtain, by injection molding, (i) a sample (6 mm in thickness×Φ 20 mm) and (ii) a disk-shaped sample (1 mm in thickness×Φ 25.4 mm). The polymer (thermoplastic resin) of this Example was obtained by copolymerizing p-hydroxybenzoic acid with the polymer (thermoplastic resin) of Example 11.

Table A shows conditions for injection molding and properties of obtained molded articles for the resins of Examples 11 and 12.

TABLE 1

|  |  | Ex. 11 | Ex. 12 |
|---|---|---|---|
| Tm (° C.) | | 205 | 200 |
| Ti (° C.) | | 280 | 320 |
| Melting Temperature during Injection Molding (° C.) | | 225 | 235 |
| Ratio of Lamellar Crystals (%) | | 60 | 33 |
| Density (g/cm$^3$) | | 1.24 | 1.34 |
| Thermal Conductivity of 6 mm × 20 mm (W/m · K) | | 0.60 | 0.55 |
| Thermal Conductivity of 1 mm × 25.4 mm (W/m · K) | Thickness Direction | 0.83 | 0.51 |
| | Plane Direction | 0.73 | 0.82 |

It is clear that the thermoplastic resins according to Examples 11 and 12 are extremely useful since the thermoplastic resins have thermal conductivities of not less than 0.45 W/(m·K), the thermal conductivities being measured by the hot disk method (see Table 1). Table 1 also shows that the thermoplastic resins according to Examples 11 and 12 are highly thermally conductive both in respective thickness and plane directions. In view of the above, it is clear that the thermoplastic resins according to Examples 11 and 12 are highly thermally conductive not only in one direction but also isotropically.

Further, according to Example 11, even in the case of a resin which has an identical primary structure, depending on a thermal history of the resin, a ratio of lamellar crystals to the resin and crystallinity greatly change and a thermal conductivity of the resin changes.

Example 13

4,4'-dihydroxyphenyl, sebacic acid, and acetic anhydride were placed in a molar ratio of 1:1.05:2.1 in a sealed reactor vessel. An acetylated reaction was carried out under an ordinary pressure in an atmosphere of nitrogen gas at 150° C. for 3 hours. Then, polycondensation was conducted in the vessel heated to 280° C. at a rate of temperature increase of 1° C./min. When an amount of distillate acetic acid reached 90% of a theoretical yield of acetic acid, approximately 20 minutes were spent to decompress the vessel to 10 torr with the temperature maintained at 280° C., so as to carry out melt polymerization until the polymer was grown to a high molecular weight. One hour after the beginning of the decompression, the pressure inside the vessel was brought back to an ordinary pressure with an inert gas and then a generated polymer was collected. Table 2 shows a molecular structure of the thermoplastic resin of Example 13, and Table 3 shows (i) a number average molecular weight of the thermoplastic resin of Example 13 and (ii) a thermal conductivity of the thermoplastic resin itself.

Examples 14 and 15

In Examples 14 and 15, as in the case of Example 13, polymerization was carried out so as to synthesize resins which have different number average molecular weights, except that the polymerization time period from the beginning of the decompression in Example 13 was changed in Examples 14 and 15 to 1.5 hour and 3 hours, respectively. Table 2 shows molecular structures of the thermoplastic resins of respective Examples 14 and 15, and Table 3 shows (i) number average molecular weights of the thermoplastic resins of respective Examples 14 and 15 and (ii) thermal conductivities of the thermoplastic resins themselves.

Examples 16 through 18

In Examples 16 through 18, as in the cases of Examples 13 through 15, polymerization was carried out so as to synthesize resins which have different number average molecular weights, except that sebacic acid used in each of Examples 13 through 15 was replaced with dodecanedioic acid. Table 2 shows molecular structures of the thermoplastic resins of respective Examples 16 through 18, and Table 3 shows (i) number average molecular weights of the thermoplastic resins of respective Examples 16 through 18 and (ii) thermal conductivities of the thermoplastic resins themselves.

Examples 19 through 21

In Examples 19 through 21, as in the cases of Examples 13 through 15, polymerization was carried out so as to synthesize resins which have different number average molecular weights, except that sebacic acid used in each of Examples 13 through 15 was replaced with tetradecanedioic acid. Table 2 shows molecular structures of the thermoplastic resins of respective Examples 19 through 21, and Table 3 shows (i) number average molecular weights of the thermoplastic resins of respective Examples 19 through 21 and (ii) thermal conductivities of the thermoplastic resins themselves.

Example 22

4,4'-biphenyldicarboxylic acid dimethyl and 1,10-decane diol were placed in a molar ratio of 1:1.05 in a polymerization reactor, and TBT (tetrabutyl titanate) was added as a catalyst in $5 \times 10^{-4}$ mol with respect to 1 mol of structural units of polyester, so as to distil methanol by carrying out an ester exchange reaction at 280° C. Then, a polycondensation reaction was carried out under a reduced pressure of 10 torr at a temperature of 280° C. for 1.5 hour. Thereafter, the pressure inside the reactor was brought back to an ordinary pressure with an inert gas and then a generated polymer was collected. Table 2 shows a molecular structure of the thermoplastic resin of Example 22, and Table 3 shows (i) a number average molecular weight of the thermoplastic resin of Example 22 and (ii) a thermal conductivity of the thermoplastic resin itself.

Example 23

In Example 23, polymerization was carried out as in the case of Example 22, except that 1,10-decane diol used in Example 22 was replaced with triethylene glycol. Table 2 shows a molecular structure of the thermoplastic resin of Example 23, and Table 3 shows (i) a number average molecular weight of the thermoplastic resin of Example 23 and (ii) a thermal conductivity of the thermoplastic resin itself.

Example 24

4-acetoxybenzoic acid-acetoxyphenyl and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to not more than 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 2 shows a molecular structure of the thermoplastic resin of Example 24, and Table 3 shows (i) a number average molecular weight of the thermoplastic resin of Example 24 and (ii) a thermal conductivity of the thermoplastic resin itself.

Example 25

4,4'-diacetoxyazoxybenzene and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 2 shows a molecular structure of the thermoplastic resin of Example 25, and Table 3 shows (i) a number average molecular weight of the thermoplastic resin of Example 25 and (ii) a thermal conductivity of the thermoplastic resin itself.

Examples 26 and 27

Mixtures were prepared in which (i) the liquid crystalline thermoplastic resin synthesized in Example 17 and (ii) boron nitride powder (h-BN) (PT110, produced by Momentive Performance Materials Inc.; a thermal conductivity per se: 60 W/(m·K); a volume average particle size: 45 μm; electrically insulative, a volume resistivity: $10^{14}$ Ω·cm) which is an inorganic filler were mixed in respective compositions shown in Table 4. AO-60 (produced by ADEKA CORPORATION) which is a phenolic stabilizer was added to each of the mixtures in 0.2 part by weight with respect to 100 parts by weight of thermoplastic resin. Then, the mixtures were melt-mixed by use of LABO-PLASTOMIL (30C150, produced by TOYO SEIKI SEISAKU-SHO, LTD) at 250° C. for 7 minutes, so as to obtain resin compositions to be evaluated. The resin compositions were molded into disk-shaped samples (6 mm in thickness×Φ 20 mm) by an injection molding machine, so as to measure thermal conductivities of the respective disk-shaped samples. Table 4 shows a result of the measurement.

Example 28

A mixture was prepared in which (i) the thermoplastic resin synthesized in Example 17 and (ii) natural plate-like graphite powder (GC) (BF-250A, produced by Chuetsu Graphite Works Co., Ltd.; a thermal conductivity per se: 1200 W/(m·K); a volume average particle size: 250.0 μm; electro-conductive) were mixed in a composition shown in Table 4.

AO-60 (produced by ADEKA CORPORATION) which is a phenolic stabilizer was added to the mixture in 0.2 parts by weight with respect to 100 parts by weight of thermoplastic resin. Then, the mixture was melt-mixed by use of LABO-PLASTOMIL (30C150, produced by TOYO SEIKI SEI-SAKU-SHO, LTD) at 250° C. for 7 minutes, so as to obtain a resin composition to be evaluated. The resin composition was molded into a disk-shaped sample (6 mm in thickness×Φ 20 mm) by an injection molding machine, so as to measure a thermal conductivity of the disk-shaped sample. Table 4 shows a result of the measurement.

TABLE 4

| Composition [vol %] | | Ex. 26 | Ex. 27 | Ex. 28 |
|---|---|---|---|---|
| Resin (A) | Ex. 7 | 70 | 50 | 50 |
| Inorganic Sub- | h-BN | 30 | 50 | |
| stance (B) | GC | | | 50 |
| Thermal Conductivity (W/m · K) | | 5.4 | 21 | 60 |
| Density [g/cm$^3$] | | 1.52 | 1.74 | 1.72 |

TABLE 2

| | Mesogenic Group M | | | Flexible Group Sp | | |
|---|---|---|---|---|---|---|
| | A$^1$ | x | A$^2$ | y | R | z |
| Ex. 13 Ex. 14 Ex. 15 | 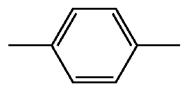 | (Direct Bond) | 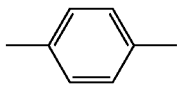 | —O—C(=O)— | —(CH$_2$)$_8$— | —C(=O)—O— |
| Ex. 16 Ex. 17 Ex. 18 | 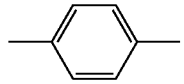 | (Direct Bond) |  | —O—C(=O)— | —(CH$_2$)$_{10}$— | —C(=O)—O— |
| Ex. 19 Ex. 20 Ex. 21 | 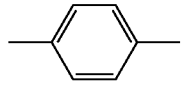 | (Direct Bond) |  | —O—C(=O)— | —(CH$_2$)$_{12}$— | —C(=O)—O— |
| Ex. 22 | 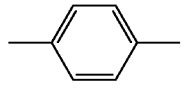 | (Direct Bond) | 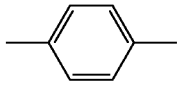 | —C(=O)—O— | —(CH$_2$)$_{10}$— | —O—C(=O)— |
| Ex. 23 | 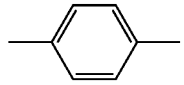 | (Direct Bond) | 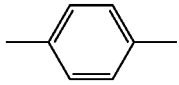 | —C(=O)—O— | —(C$_2$H$_5$O)$_2$C$_2$H$_5$— | —O—C(=O)— |
| Ex. 24 |  | —O—C(=O)— |  | —O—C(=O)— | —(CH$_2$)$_{10}$— | —C(=O)—O— |
| Ex. 25 |  | —N(O)=N— |  | —O—C(=O)— | —(CH$_2$)$_{10}$— | —C(=O)—O— |

TABLE 3

| | Ex. 13 | Ex. 14 | Ex. 15 | Ex. 16 | Ex. 17 | Ex. 18 |
|---|---|---|---|---|---|---|
| Number Average Molecular Weight | 8160 | 12000 | 34400 | 8500 | 10700 | 24100 |
| Ratio of Lamellar Crystals (%) | 42 | 60 | 33 | 95 | 90 | 13 |
| Density (g/cm$^3$) | 1.24 | 1.24 | 1.24 | 1.20 | 1.20 | 1.20 |
| Thermal Conductivity of Resin per se [W/m · K] | 0.60 | 0.72 | 0.55 | 1.36 | 1.27 | 0.46 |

| | Ex. 19 | Ex. 20 | Ex. 21 | Ex. 22 | Ex. 23 | Ex. 24 | Ex. 25 |
|---|---|---|---|---|---|---|---|
| Ratio of Lamellar Crystals (%) | 67 | 88 | 42 | 51 | 22 | 87 | 74 |
| Density (g/cm$^3$) | 1.17 | 1.17 | 1.17 | 1.20 | 1.24 | 1.21 | 1.19 |
| Number Average Molecular Weight | 7960 | 13600 | 18800 | 8470 | 9660 | 12400 | 8930 |
| Thermal Conductivity of Resin per se [W/m · K] | 0.80 | 1.16 | 0.60 | 0.65 | 0.50 | 1.17 | 0.92 |

Example 29 through Example 52

100 parts by weight of the organic polymer shown in Table 5; a thermally-conductive organic additive (A1) in the amount (parts by weight) shown in Table 5; and 0.2 parts by weight of AO-50 (produced by ADEKA CORPORATION) were mixed. Then the mixture was introduced via a hopper into a double screw extruder KZW15-45 (produced by TECH-NOVEL CORPORATION) in which two screws were directed in the same direction in engagement with each other, the hopper being provided near the foot of the screws of the extruder. A resin composition was obtained by such extruding with the use of the double screws. A temperature of the extruder was set to 200° C. in the vicinity of a supply port and to be higher gradually along the extruder, so that a temperature around a top of the extruder screws was the temperature shown in Table 5. The resin composition thus obtained was molded into disk-shaped samples (6 mm in thickness×Φ 20 mm) by an injection molding machine and thermal conductivities of the samples were measured. Table 5 shows a result of the measurement of the thermal conductivities. In Table 5, "Excellent" represents a case where thermal conductivity of a sample is substantially improved as compared with that of an organic polymer; "Good" represent a case where thermal conductivity of a sample is slightly improved; and "No-change" represents a case where thermal conductivity of a sample is virtually not changed.

TABLE 5

| | Type of Organic Polymer | Amount of A1 | Temperature at the top of the Extruder | Change of Thermal Conductivity |
|---|---|---|---|---|
| Ex. 29 | Vinyl chloride | 9900 | 220 | Excellent |
| Ex. 30 | Polyethylene | 10 | 250 | Good |
| Ex. 31 | Polypropylene | 10 | 220 | Good |
| Ex. 32 | Polystyrene | 10 | 230 | Good |
| Ex. 33 | Norbornene resin | 900 | 220 | Good |
| Ex. 34 | Polytetrafluoroethylene | 9900 | 220 | Good |
| Ex. 35 | Polyacrylonitrile | 9900 | 220 | Excellent |
| Ex. 36 | Polyacetal | 900 | 220 | Excellent |
| Ex. 37 | Polyetheretherketone | 10 | 360 | Good |
| Ex. 38 | Polycarbonate | 100 | 280 | Excellent |
| Ex. 39 | ABS resin | 100 | 260 | Excellent |
| Ex. 40 | Polysulfone | 9900 | 220 | Excellent |
| Ex. 41 | Polyphenylene ether | 900 | 310 | Excellent |
| Ex. 42 | Polyphenylene sulfide | 100 | 310 | Excellent |
| Ex. 43 | Polybutylene telephthalate | 100 | 260 | Excellent |
| Ex. 44 | Polymethyl methacrylate | 100 | 250 | Excellent |
| Ex. 45 | Guanamine resin | 9900 | 220 | Excellent |
| Ex. 46 | Diallyl phthalate resin | 9900 | 220 | Excellent |
| Ex. 47 | Phenol resin | 9900 | 220 | Excellent |
| Ex. 48 | Unsaturated polyester resin | 9900 | 220 | Excellent |
| Ex. 49 | Polyurethane | 9900 | 220 | Excellent |
| Ex. 50 | Maleic acid | 9900 | 220 | Excellent |
| Ex. 51 | Melamine resin | 9900 | 220 | Excellent |
| Ex. 52 | Urea resin | 9900 | 220 | Excellent |

The invention claimed is:

1. A resin composition comprising:
(A) a thermally-conductive organic additive consisting of a liquid crystalline thermoplastic resin which has a mainly-chain structure, wherein a main chain of the liquid crystalline thermoplastic resin contains mainly a repeating unit represented by the general formula (2) and (ii) per se has a thermal conductivity of not less than 0.45 W/(m·K);

$$-A^1\text{-}x\text{-}A^2\text{-}y\text{-}R\text{-}z- \quad (2)$$

wherein each of $A^1$ and $A^2$ independently represents a substituent group selected from an aromatic group, a condensed aromatic group, an alicyclic group, and an alicyclic heterocyclic group; x represents a direct bond, or a bivalent substituent group selected from the group consisting of —$CH_2$—, —$C(CH_3)_2$—, —O—, —S—, —$CH_2$—$CH_2$—, —C=C—, —C≡C—, —CO—, —CO—O—, —CO—NH—, —CH=N—, —CH=N—N=CH—, —N=N—, and —N(O)=N—; R represents a bivalent substituent group which has a main chain length of 2 to 20 atoms and may be branched; and -y-R-z is —O—CO—R—CO—O—,
(B) a thermosetting resin; and
(C) an inorganic filler.

2. A cured product obtained from a resin composition as recited in claim 1.

3. The resin composition as set forth in claim 1, wherein -$A^1$-x-$A^2$- of the liquid crystalline thermoplastic resin is a mesogenic group represented by the general formula (3):

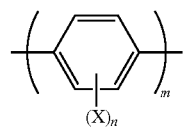

$$(3)$$

wherein X independently represents an aliphatic hydrocarbon group, F, Cl, Br, I, CN, or $NO_2$; n is an integer of 0 to 4; and m is an integer of 2 to 4.

4. The resin composition as set forth in claim 1, wherein R of the liquid crystalline thermoplastic resin is a linear aliphatic hydrocarbon chain.

5. The resin composition as set forth in claim 4, wherein R of the liquid crystalline thermoplastic resin has a main chain length of even-numbered carbon atoms.

6. The resin composition as set forth in claim 4, wherein R of the liquid crystalline thermoplastic resin is of at least one kind selected from —$(CH_2)_8$—, —$(CH_2)_{10}$—, and —$(CH_2)_{12}$—, the liquid crystalline thermoplastic resin having a number average molecular weight of 3000 to 40000.

7. The resin composition as set forth in claim 1, wherein the thermally-conductive organic additive (A) is added in 1 part by weight to 10000 parts by weight with respect to 100 parts by weight of the thermosetting resin (B).

8. The resin composition as set forth in claim 1, wherein the liquid crystalline thermoplastic resin contains lamellar crystals by not less than 10 vol %.

9. The resin composition as set forth in claim 1, wherein the liquid crystalline thermoplastic resin has a crystallinity of not less than 7 vol %.

10. A method of improving a thermal conductivity of a thermosetting resin (B), comprising the step of adding, to the thermosetting resin (B), (i) a thermally-conductive organic additive (A) consisting of a liquid crystalline thermoplastic resin and (ii) an inorganic filler (C),
the liquid crystalline thermoplastic resin (i) having a mainly-chain structure, wherein a main chain of the liquid crystalline thermoplastic resin contains mainly a repeating unit represented by the general formula (2) and (ii) per se having a thermal conductivity of not less than 0.45 W/(m·K), $$-A^1\text{-}x\text{-}A^2\text{-}y\text{-}R\text{-}z- \quad (2)$$

wherein each of $A^1$ and $A^2$ independently represents a substituent group selected from an aromatic group, a condensed aromatic group, an alicyclic group, and an alicyclic heterocyclic group; x represents a direct bond, or a bivalent substituent group selected from the group consisting of —CH$_2$—, —C(CH$_3$)$_2$—, —O—, —S—, —CH$_2$—CH$_2$—, —C=C—, —C≡C—, —CO—, —CO—O—, —CO—NH—, —CH=N—, —CH=N—N=CH—, —N=N—, and —N(O)N—; R represents a bivalent substituent group which has a main chain length of 2 to 20 atoms and may be branched; and -y-R-z- is —O—CO—R—CO—O—.

11. The method as set forth in claim 10, wherein -A$^1$-x-A$^2$- of the liquid crystalline thermoplastic resin is a mesogenic group represented by the general formula (3);

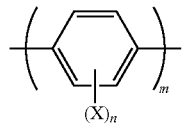

(3)

wherein X independently represents an aliphatic hydrocarbon group, F, Cl, Br, I, CN, or NO$_2$; n is an integer of 0 to 4; and m is an integer of 2 to 4.

12. The method as set forth in claim 10, wherein R of the liquid crystalline thermoplastic resin is a linear aliphatic hydrocarbon chain.

13. The method as set forth in claim 12, wherein R of the liquid crystalline thermoplastic resin as a main chain length of even-numbered carbon atoms.

14. The method as set forth in claim 12, wherein R of the liquid crystalline thermoplastic resin is of at least one kind selected from —(CH$_2$)$_8$—, —(CH$_2$)$_{10}$—, and —(CH$_2$)$_{12}$—, the liquid crystalline thermoplastic resin having a number average molecular weight of 3000 to 40000.

15. The method as set forth in claim 10, wherein the thermally-conductive organic additive (A) is added in 1 part by weight to 10000 parts by weight with respect to 100 parts by weight of the thermosetting resin (B).

16. The method as set forth in claim 10, wherein the liquid crystalline thermoplastic resin contains lamellar crystals by not less than 10 vol %.

17. The method as set forth in claim 10, wherein the liquid crystalline thermoplastic resin has a crystallinity of not less than 7 vol %.

18. The method as set forth in claim 10, wherein a volume ratio of the thermally-conductive organic additive (A) to the inorganic filler (C) is 99:1 to 30:70.

* * * * *